US012769752B2

(12) United States Patent
Han et al.

(10) Patent No.: US 12,769,752 B2
(45) Date of Patent: Oct. 20, 2026

(54) QUERY METHOD AND RELATED DEVICE

(71) Applicant: HUAWEI TECHNOLOGIES CO., LTD., Shenzhen (CN)

(72) Inventors: Meng Han, Hangzhou (CN); Xinyu Zhang, Hangzhou (CN); Yongkang Wu, Hangzhou (CN); Zikai Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/023,767

(22) Filed: Jan. 16, 2025

(65) Prior Publication Data

US 2025/0156434 A1 May 15, 2025

Related U.S. Application Data

(63) Continuation of application No. PCT/CN2022/106369, filed on Jul. 19, 2022.

(51) Int. Cl.
*G06F 16/248* (2019.01)
*G06F 16/22* (2019.01)

(52) U.S. Cl.
CPC ........ *G06F 16/248* (2019.01); *G06F 16/2237* (2019.01)

(58) Field of Classification Search
None
See application file for complete search history.

(56) References Cited

U.S. PATENT DOCUMENTS

| | | | | |
|---|---|---|---|---|
| 10,860,799 | B2 | 12/2020 | Andreica et al. | |
| 12,332,896 | B1 * | 6/2025 | Xu | G06F 16/24549 |
| 12,602,549 | B1 * | 4/2026 | Galvin | G06F 40/30 |
| 2016/0344772 | A1 * | 11/2016 | Monahan | G06F 16/248 |
| 2019/0362246 | A1 * | 11/2019 | Lin | G06F 16/9024 |
| 2020/0242146 | A1 | 7/2020 | Kalukin | |
| 2022/0383159 | A1 * | 12/2022 | Yavuz | G06N 3/0455 |
| 2025/0156434 | A1 * | 5/2025 | Han | G06F 16/2237 |
| 2025/0272316 | A1 * | 8/2025 | Sridhar | G06F 40/30 |
| 2026/0050860 | A1 * | 2/2026 | Sreekumar | G06Q 10/06393 |

(Continued)

FOREIGN PATENT DOCUMENTS

| | | | |
|---|---|---|---|
| CN | 103124980 | A | 5/2013 |
| CN | 111897959 | A | 11/2020 |
| CN | 113536809 | A | 10/2021 |

OTHER PUBLICATIONS

Reasoning on Regular Path Queries (Year: 2003).*

(Continued)

*Primary Examiner* — Kim T Nguyen

(57) ABSTRACT

A query method and a related device are disclosed. The query method includes: obtaining a query input by a user; and generating a query result, where the query result includes a first answer to the query, a first major premise and a first minor premise used to obtain the first answer through deductive reasoning, a first major premise evidence for proving the first major premise, and a first minor premise evidence for proving the first minor premise; or the query result includes a first answer to the query, a first major premise and a first minor premise used to obtain the first answer through deductive reasoning, and a first minor premise evidence for proving the first minor premise.

19 Claims, 12 Drawing Sheets

(56) References Cited

U.S. PATENT DOCUMENTS

| | | | | |
|---|---|---|---|---|
| 2026/0105260 A1* | 4/2026 | Galvin | ................ | G06F 3/04815 |
| 2026/0111701 A1* | 4/2026 | Zhang | .................... | G06N 3/042 |
| 2026/0148163 A1* | 5/2026 | Crabtree | .......... | G06Q 10/06316 |

OTHER PUBLICATIONS

QueryPIE: Backward reasoning for OWL Horst over very large knowledge bases (Year: 2011).*
Rajarshi Das et al., "Case-Based Reasoning for Natural Language Queries over Knowledge Bases", effecarXiv:2104.08762v2 [cs.CL] Nov. 7, 2021, total 18 pages.
Apoorv Saxena et al., "Improving Multi-hop Question Answering over Knowledge Graphs using Knowledge Base Embeddings", Proceedings of the 58th Annual Meeting of the Association for Computational Linguistics, Jul. 5-10, 2020, total 10 pages.
International Search Report and Written Opinion issued in PCT/CN2022/106369, dated Dec. 21, 2022, 9 pages.

* cited by examiner

QUERY METHOD AND RELATED DEVICE

CROSS-REFERENCE TO RELATED APPLICATIONS

This application is a continuation of International Application No. PCT/CN2022/106369, filed on Jul. 19, 2022, the disclosure of which is hereby incorporated by reference in its entirety.

TECHNICAL FIELD

Embodiments of this disclosure relate to the field of artificial intelligence and computer search technologies, and in particular, to a query method and a related device.

BACKGROUND

Computer search technologies have begun to be applied to search systems of a plurality of enterprises. To implement a precise query, the following methods are commonly used currently:

(1) Search+Extraction method: obtaining a query-related content web page through search, and then reading the web page for extraction to obtain an answer to the query.

(2) Parsing+Graph query method: for a search query, first converting a natural statement into a graph query statement (for example, an SPARQL, full name: SPARQL Protocol and RDF Query Language) through parsing, and then retrieving a graph based on the graph query statement, to obtain an answer to the query.

The Search+Extraction method can be used to obtain a possible result set through search, and then obtain the answer through complex extraction. The Parsing+Graph query method can be used to answer some common sense queries manually summarized. However, the foregoing methods still have many disadvantages. For example, it is difficult to provide correct answers to a common sense query, an opinion query, a complex query, and a new query, and the queries have low credibility and explainability.

SUMMARY

This disclosure provides a query method and a related device, to provide correct answers to a common sense query, an opinion query, a complex query, and a new query.

According to a first aspect, an embodiment of this disclosure provides a query method, applied to a first electronic device. The method includes: obtaining a query of a user; and generating a query result, where the query result includes a first answer to the query, a first major premise and a first minor premise used to obtain the first answer through deductive reasoning, a first major premise evidence for proving the first major premise, and a first minor premise evidence for proving the first minor premise; or the query result includes a first answer to the query, a first major premise and a first minor premise used to obtain the first answer through deductive reasoning, and a first minor premise evidence for proving the first minor premise. The first major premise evidence and the first minor premise evidence are evidence information obtained through retrieval of the query of the user. The first major premise is obtained through inductive reasoning based on the first major premise evidence, or the first major premise is common sense information obtained through retrieval of the query of the user. It should be understood that, when the first major premise is the common sense information obtained through retrieval, the query result does not include the major premise evidence; or when the first major premise is obtained through inductive reasoning based on the first major premise evidence, the query result includes the first major premise evidence. The first minor premise is generated based on the first minor premise evidence. In this embodiment, for the query of the user, the first electronic device may retrieve related major premise evidences and minor premise evidences. For example, the first electronic device may absorb knowledge from massive information on the internet as a major premise evidence and a minor premise evidence. The major premise evidence may be used to obtain a major premise, and the minor premise evidence may be used to obtain a minor premise. This greatly improves query coverage. In addition, for the query of the user, the first electronic device may alternatively directly retrieve a related major premise. For example, the first electronic device may retrieve common sense information as a major premise of deductive reasoning. The first electronic device may perform inductive reasoning based on the major premise evidence obtained through retrieval to obtain a major premise of deductive reasoning, and generate, based on a minor premise evidence obtained through retrieval, a minor premise of deductive reasoning. Then, the electronic device performs deductive reasoning based on the major premise obtained through retrieval and/or inductive reasoning and the foregoing generated minor premise, to obtain an answer to the query. In this way, the first electronic device can obtain an answer to the query through deductive reasoning, and therefore can provide correct answers to a common sense query, an opinion query, a complex query, and a new query. In addition, in addition to the answer to the query, a query result further includes the major premise and the minor premise used to obtain the answer through deductive reasoning, and the major premise evidence for proving the major premise and the minor premise evidence for proving the minor premise. This can improve the credibility and explainability of the query.

In an example embodiment, the generating a query result includes: obtaining N second major premises based on a first vector, where the first vector represents a target text, the target text indicates the query, the N second major premises include the first major premise, and N is a positive integer; performing retrieval in a first database based on N second vectors, to obtain P second minor premise evidences, where the N second vectors correspond to the N second major premises, any one of the N second vectors represents the target text and a second major premise corresponding to the any second vector, the P second minor premise evidences include the first minor premise evidence, and P is a positive integer; generating M second minor premises based on the target text, the N second major premises, and the P second minor premise evidences, where the M second minor premises include the first minor premise, and Mis a positive integer less than or equal to P; and performing deductive reasoning based on the N second major premises and the M second minor premises, to obtain the first answer, where the first major premise evidence is obtained through retrieval in the first database based on the first vector. The first vector may be obtained by performing vector representation on the target text by using a semantic representation model, and the second vector may be obtained by performing vector representation on the target text and the second major premise by using the semantic representation model. It should be understood that the target text and one major premise are represented as one second vector. Because there are N major premises, there are N second vectors. The first database may be a web page library. In this embodiment, for the query of the user, the first electronic device can automatically select an appropriate major premise, and then automatically select an appropriate minor premise evidence from the first database (for example, the web page library) to generate a minor premise. This supplements a reasoning path of deductive reasoning, and effectively predicts the answer to the query.

In an example embodiment, the obtaining N second major premises based on a first vector includes: performing retrieval in the first database based on the first vector, to obtain L second major premise evidences, where L is a positive integer greater than or equal to N; and performing inductive reasoning based on the L second major premise evidences, to obtain the N second major premises. For example, the L second major premise evidences may include the first major premise evidence. In this embodiment, for the query of the user, the first electronic device can automatically select an appropriate major premise evidence from the first database (for example, the web page library) to perform inductive reasoning, to obtain a major premise. This helps supplement the reasoning path of deductive reasoning.

In an example embodiment, the performing inductive reasoning based on the L second major premise evidences, to obtain the N second major premises includes: performing retrieval in the first database based on the first vector, to obtain a negative example of a third major premise evidence, where the L second major premise evidences include the third major premise evidence, and the third major premise evidence is used to obtain a third major premise through inductive reasoning; and performing inductive reasoning based on the negative example of the third major premise evidence, to obtain a fourth major premise, where if the third major premise does not conflict with the fourth major premise, the third major premise is one of the N second major premises; or if the third major premise conflicts with the fourth major premise, retrieval is performed in the first database based on the first vector, to obtain a fourth major premise evidence, and inductive reasoning is performed based on the fourth major premise evidence, to obtain a fifth major premise, where the fifth major premise is one of the N second major premises. In this embodiment, the first electronic device obtains a major premise of deductive reasoning through inductive reasoning in a negative example induction manner. A process of negative example induction is as follows: One major premise is obtained through inductive reasoning based on a major premise evidence, and another major premise is obtained through inductive reasoning based on a negative example of the major premise evidence. Then, whether the two major premises obtained through induction conflict is determined. If the two major premises do not conflict, the major premise obtained through inductive reasoning based on the major premise evidence is accurate and credible, and can be for deductive reasoning; or if the two major premises conflict, a major premise evidence is re-retrieved for the query of the user, and negative example induction is performed again based on the major premise evidence obtained through re-retrieval. In this way, the first electronic device has high accuracy and credibility during inductive reasoning, adapts to a feature of noisy and different internet information, and imitates a human cognitive development process (that is, a process of continuously correcting information that is newly input and that is not expected). It should be noted that, when the first electronic device obtains the major premise of deductive reasoning through inductive reasoning in a negative example induction manner, the first electronic device may re-retrieve the major premise evidence. Therefore, the L second major premise evidences do not necessarily include the first major premise evidence, and the first major premise evidence may be the major premise evidence obtained through re-retrieval. For example, the first major premise evidence is the fourth major premise evidence.

In an example embodiment, the obtaining N second major premises based on a first vector includes: performing retrieval in the first database based on the first vector, to obtain R second major premise evidences, where R is a positive integer; performing retrieval in a second database based on the first vector, to obtain target common sense information; and performing inductive reasoning based on the R second major premise evidences and the target common sense information, to obtain Q second major premises, where Q is a positive integer less than or equal to R; and the N second major premises include the target common sense information and the Q second major premises. For example, the R second major premise evidences may include the first major premise evidence. The second database may be a common sense library. In this embodiment, for the query of the user, the first electronic device can automatically select an appropriate major premise evidence from the first database (for example, the web page library) to perform inductive reasoning, to obtain a major premise, and can automatically select appropriate common sense information from the second database (for example, the common sense library) as a major premise. This helps supplement the reasoning path of deductive reasoning. The common sense information is obtained through pre-inductive reasoning, and the common sense information obtained through retrieval may be used as the major premise. This reduces a workload of inductive reasoning during an online query. Inductive reasoning is performed based on the common sense information obtained through retrieval and the major premise evidence obtained through retrieval in the web page library. The common sense information may assist in inductive reasoning on the major premise evidence. This helps obtain a correct major premise.

In an example embodiment, the method further includes: writing the Q second major preambles into the second database. In this embodiment, in a process of performing the online query, the first electronic device may store, in the common sense library, the major premise obtained through inductive reasoning. This continuously refreshes the common sense library and enriches common sense information in the common sense library.

In an example embodiment, the performing deductive reasoning based on the N second major premises and the M second minor premises, to obtain the first answer includes: determining a first premise combination from N×M premise combinations, where the N×M premise combinations are obtained by combining each of the N second major premises with each of the M second minor premises, and the first premise combination includes the first major premise and the first minor premise; and performing deductive reasoning based on the first premise combination, to obtain the first answer. In this embodiment, for one query, a plurality of major premises may be obtained through induction and a plurality of minor premises may be generated. After combining each major premise with each minor premise, the first electronic device selects a most appropriate premise combination from all premise combinations obtained through combination for deductive reasoning, to obtain an answer to the query. This performs deductive reasoning based on the premise combination, and can form an explicit reasoning path. For example, the premise combinations obtained through combination may be scored and sorted based on a specific scoring policy, to facilitate selection of the most appropriate premise combination for deductive reasoning. This can select a best reasoning path to generate an answer to the query.

In an example embodiment, the performing deductive reasoning based on the first premise combination, to obtain the first answer includes: inputting a term graph into a deductor, to obtain the first answer, where the term graph represents the first premise combination, and the deductor is a neural network model for deductive reasoning. In this embodiment, a premise combination of a free text is converted into a term graph as an input of the deductor, so that the deductor directly models a logical relationship of the free text. This effectively improves a logical reasoning capability of the deductor for the free text, and helps the deductor output a correct answer to a query.

In an example embodiment, the method further includes: calculating a loss based on term graph coding and syllogism text coding, where the term graph coding is a coding representation of the term graph, and the syllogism text coding is a coding representation of a syllogism text including the first answer, the first major premise, and the first minor premise; and adjusting a model parameter of the deductor based on the loss. In this embodiment, in a process of performing deductive reasoning, the first electronic device further calculates the loss based on the coding representation of the term graph and the coding representation of the syllogism text, and adjusts the model parameter of the deductor based on the loss. In other words, in a process of performing deductive reasoning by using the deductor, the loss is calculated by using an input and an output of the deductor, and the model parameter of the deductor is adjusted, to implement training optimization of the deductor. This helps improve deductive reasoning precision of the deductor.

In an example embodiment, the determining a first premise combination from N×M premise combinations includes: determining a second premise combination from the N×M premise combinations; performing deductive reasoning based on the second premise combination, to obtain a second answer; and determining the first premise combination from the N×M premise combinations based on feedback from the user and/or feedback from an answer verification module for the second answer, where the answer verification module is configured to determine whether an answer obtained through deductive reasoning conforms to factual logic. In this embodiment, because there are a large quantity of premise combinations obtained through combination and all the premise combinations can generate a deductive reasoning conclusion, a most appropriate premise combination may be selected, based on feedback from the user and/or feedback from the answer verification module for the deductive reasoning conclusion, in real time for deductive reasoning. This improves a speed of optimizing query effect of the first electronic device, and provides a correct answer to a query.

In an example embodiment, the target text further includes user context information of the user. In this embodiment, the first electronic device obtains the query of the user and the user context information for retrieval. This can improve query experience of the user.

In an example embodiment, the method further includes: presenting a query interface on a screen of the first electronic device, where the query interface includes the query result. In this embodiment, the first electronic device may include the screen. The user may input the query on the screen, and then the first electronic device displays the query interface on the screen of the first electronic device. In addition to the answer to the query, the query interface also presents the major premise and the minor premise of deductive reasoning, the major premise evidence, and the minor premise evidence. This presents an entire reasoning process of the query and related evidence, and greatly enhances query credibility and explainability.

In an example embodiment, the obtaining a query of a user includes: receiving the query from a second electronic device; and the method further includes: sending the query result to the second electronic device. In this embodiment, the second electronic device includes a screen. The user may input the query on the screen of the second electronic device. The second electronic device sends the query to the first electronic device. The first electronic device generates the query result of the query and sends the query result back to the second electronic device. Then, the second electronic device presents a query interface on the screen of the second electronic device, so as to feed back the query result to the user. This enriches application scenarios of the query.

According to a second aspect, an embodiment of this disclosure provides a query method, used in a second electronic device. The method includes: obtaining a query of a user; sending the query to a first electronic device; receiving a query result from the first electronic device, where the query result includes a first answer to the query, a first major premise and a first minor premise used to obtain the first answer through deductive reasoning, a first major premise evidence for proving the first major premise, and a first minor premise evidence for proving the first minor premise; or the query result includes a first answer to the query, a first major premise and a first minor premise used to obtain the first answer through deductive reasoning, and a first minor premise evidence for proving the first minor premise; and presenting a query interface on a screen of the second electronic device, where the query interface includes the query result. In this embodiment, the second electronic device includes the screen. The user may input the query on the screen of the second electronic device. The second electronic device sends the query to the first electronic device. The first electronic device generates the query result of the query and sends the query result back to the second electronic device. Then, the second electronic device presents the query interface on the screen of the second electronic device, so as to feed back the query result to the user. This enriches application scenarios of the query.

According to a third aspect, an embodiment of this disclosure provides a query method, used in an electronic device. The electronic device includes a screen, the screen displays an input box, and the method includes: obtaining a query input by a user in the input box; and displaying, on the screen, an answer to the query, a major premise and a minor premise of the answer, and a major premise evidence and a minor premise evidence, where the major premise evidence is for proving the major premise, and the minor premise evidence is for proving the minor premise; or displaying, on the screen, an answer to the query, a major premise and a minor premise of the answer, and a minor premise evidence, where the minor premise evidence is for proving the minor premise. In this embodiment, the electronic device may include the screen. The user may input the query on the screen, and then the electronic device displays, on the screen of the electronic device, the answer to the query, the major premise and the minor premise of deductive reasoning, the major premise evidence, and the minor premise evidence. This presents an entire reasoning process of the query and related evidence, and greatly enhances query credibility and explainability.

In an example embodiment, the screen displays a first presentation box, a second presentation box, and a third presentation box, the first presentation box presents the answer, the second presentation box presents the major premise and the minor premise, and the third presentation box presents the major premise evidence and the minor premise evidence, or the third presentation box presents the minor premise evidence.

In an example embodiment, the screen displays a fourth presentation box, and the fourth presentation box presents the answer, the major premise, the minor premise, the major premise evidence, and the minor premise evidence, or the fourth presentation box presents the answer, the major premise, the minor premise, and the minor premise evidence.

In an example embodiment, the screen displays a fifth presentation box and a sixth presentation box, the sixth presentation box is a pop-up presentation box of the fifth presentation box, the fifth presentation box presents the answer, and the fifth presentation box presents the major premise, the minor premise, the major premise evidence, and the minor premise evidence, or the fifth presentation box presents the major premise, the minor premise, and the minor premise evidence.

In an example embodiment, the method further includes: displaying a direct evidence on the screen, where the direct evidence is for proving the answer.

In an example embodiment, the screen further displays a seventh presentation box, and the seventh presentation box presents the direct evidence.

In an example embodiment, the fourth presentation box further presents the direct evidence.

In an example embodiment, the sixth presentation box further presents the direct evidence.

According to a fourth aspect, an embodiment of this disclosure provides a query apparatus, used in a first electronic device. The apparatus includes: an obtaining unit, configured to obtain a query of a user; and a processing unit, configured to generate a query result, where the query result includes a first answer to the query, a first major premise and a first minor premise used to obtain the first answer through deductive reasoning, a first major premise evidence for proving the first major premise, and a first minor premise evidence for proving the first minor premise; or the query result includes a first answer to the query, a first major premise and a first minor premise used to obtain the first answer through deductive reasoning, and a first minor premise evidence for proving the first minor premise.

In an example embodiment, the processing unit is specifically configured to: obtain N second major premises based on a first vector, where the first vector represents a target text, the target text indicates the query, the N second major premises include the first major premise, and N is a positive integer; perform retrieval in a first database based on N second vectors, to obtain P second minor premise evidences, where the N second vectors correspond to the N second major premises, any one of the N second vectors represents the target text and a second major premise corresponding to the any second vector, the P second minor premise evidences include the first minor premise evidence, and P is a positive integer; generate M second minor premises based on the target text, the N second major premises, and the P second minor premise evidences, where the M second minor premises include the first minor premise, and M is a positive integer less than or equal to P; and perform deductive reasoning based on the N second major premises and the M second minor premises, to obtain the first answer, where the first major premise evidence is obtained through retrieval in the first database based on the first vector.

In an example embodiment, the processing unit is specifically configured to: perform retrieval in the first database based on the first vector, to obtain L second major premise evidences, where L is a positive integer greater than or equal to N; and perform inductive reasoning based on the L second major premise evidences, to obtain the N second major premises.

In an example embodiment, the processing unit is specifically configured to: perform retrieval in the first database based on the first vector, to obtain a negative example of a third major premise evidence, where the L second major premise evidences include the third major premise evidence, and the third major premise evidence is used to obtain a third major premise through inductive reasoning; and perform inductive reasoning based on the negative example of the third major premise evidence, to obtain a fourth major premise, where if the third major premise does not conflict with the fourth major premise, the third major premise is one of the N second major premises; or if the third major premise conflicts with the fourth major premise, retrieval is performed in the first database based on the first vector, to obtain a fourth major premise evidence, and inductive reasoning is performed based on the fourth major premise evidence, to obtain a fifth major premise, where the fifth major premise is one of the N second major premises.

In an example embodiment, the processing unit is specifically configured to: perform retrieval in the first database based on the first vector, to obtain R second major premise evidences, where R is a positive integer; perform retrieval in a second database based on the first vector, to obtain target common sense information; and perform inductive reasoning based on the R second major premise evidences and the target common sense information, to obtain Q second major premises, where Q is a positive integer less than or equal to R; and the N second major premises include the target common sense information and the Q second major premises.

In an example embodiment, the processing unit is specifically configured to: determine a first premise combination from N×M premise combinations, where the N×M premise combinations are obtained by combining each of the N second major premises with each of the M second minor premises, and the first premise combination includes the first major premise and the first minor premise; and perform deductive reasoning based on the first premise combination, to obtain the first answer.

In an example embodiment, the processing unit is specifically configured to: input a term graph into a deductor, to obtain the first answer, where the term graph represents the first premise combination, and the deductor is a neural network model for deductive reasoning.

In an example embodiment, the processing unit is further configured to: calculate a loss based on term graph coding and syllogism text coding, where the term graph coding is a coding representation of the term graph, and the syllogism text coding is a coding representation of a syllogism text including the first answer, the first major premise, and the first minor premise; and adjust a model parameter of the deductor based on the loss.

In an example embodiment, the processing unit is specifically configured to: determine a second premise combination from the N×M premise combinations; perform deductive reasoning based on the second premise combination, to obtain a second answer; and determine the first premise combination from the N×M premise combinations based on feedback from the user and/or feedback from an answer verification module for the second answer, where the answer verification module is configured to determine whether an answer obtained through deductive reasoning conforms to factual logic.

In an example embodiment, the processing unit is further configured to: present a query interface on a screen of the first electronic device, where the query interface includes the query result.

In an example embodiment, the obtaining unit is specifically configured to receive the query from a second electronic device; and the processing unit is further configured to send the query result to the second electronic device.

It should be noted that, for beneficial effect brought by the embodiment of the fourth aspect, refer to corresponding descriptions of the embodiment of the first aspect.

According to a fifth aspect, an embodiment of this disclosure provides a query apparatus, used in a second electronic device. The apparatus includes: an obtaining unit, configured to obtain a query of a user; a sending unit, configured to send the query to a first electronic device; a receiving unit, configured to receive a query result from the first electronic device, where the query result includes a first answer to the query, a first major premise and a first minor premise used to obtain the first answer through deductive reasoning, a first major premise evidence for proving the first major premise, and a first minor premise evidence for proving the first minor premise; or the query result includes a first answer to the query, a first major premise and a first minor premise used to obtain the first answer through deductive reasoning, and a first minor premise evidence for proving the first minor premise; and a presentation unit, configured to present a query interface on a screen of the second electronic device, where the query interface includes the query result.

It should be noted that, for beneficial effect brought by the embodiment of the fifth aspect, refer to corresponding descriptions of the embodiment of the second aspect.

According to a sixth aspect, an embodiment of this disclosure provides a query apparatus, used in an electronic device. The electronic device includes a screen, the screen displays an input box, and the apparatus includes: an obtaining unit, configured to obtain a query input by a user in the input box; and a display unit, configured to display, on the screen, an answer to the query, a major premise and a minor premise of the answer, and a major premise evidence and a minor premise evidence, where the major premise evidence is for proving the major premise, and the minor premise evidence is for proving the minor premise; or a display unit, configured to display, on the screen, an answer to the query, a major premise and a minor premise of the answer, and a minor premise evidence, where the minor premise evidence is for proving the minor premise.

In an example embodiment, the screen displays a first presentation box, a second presentation box, and a third presentation box, the first presentation box presents the answer, the second presentation box presents the major premise and the minor premise, and the third presentation box presents the major premise evidence and the minor premise evidence, or the third presentation box presents the minor premise evidence.

In an example embodiment, the screen displays a fourth presentation box, and the fourth presentation box presents the answer, the major premise, the minor premise, the major premise evidence, and the minor premise evidence, or the fourth presentation box presents the answer, the major premise, the minor premise, and the minor premise evidence.

In an example embodiment, the screen displays a fifth presentation box and a sixth presentation box, the sixth presentation box is a pop-up presentation box of the fifth presentation box, the fifth presentation box presents the answer, and the fifth presentation box presents the major premise, the minor premise, the major premise evidence, and the minor premise evidence, or the fifth presentation box presents the major premise, the minor premise, and the minor premise evidence.

In an example embodiment, the display unit is further configured to: display a direct evidence on the screen, where the direct evidence is for proving the answer.

In an example embodiment, the screen further displays a seventh presentation box, and the seventh presentation box presents the direct evidence.

In an example embodiment, the fourth presentation box further presents the direct evidence.

In an example embodiment, the sixth presentation box further presents the direct evidence.

It should be noted that, for beneficial effect brought by the embodiment of the sixth aspect, refer to corresponding descriptions of the embodiment of the third aspect.

According to a seventh aspect, an embodiment of this disclosure provides an electronic device, including a processor, and a storage coupled to the processor and storing a computer program executed by the processor. When the computer program is executed by the processor, the electronic device is enabled to perform the method according to any one of the first aspect, the second aspect, or the third aspect.

According to an eighth aspect, an embodiment of this disclosure provides a chip, including a processor, configured to invoke a computer program from a storage and run the computer program, so that a device on which the chip is installed performs the method according to any one of the first aspect, the second aspect, or the third aspect.

According to a ninth aspect, an embodiment of this disclosure provides a computer-readable storage medium. The computer-readable storage medium stores instructions, and when the instructions are executed by a processor, the method according to any one of the first aspect, the second aspect, or the third aspect is implemented.

According to a tenth aspect, an embodiment of this disclosure provides a computer program product, including a computer program. When the computer program is executed by a processor, the method according to any one of the first aspect, the second aspect, or the third aspect is implemented.

BRIEF DESCRIPTION OF DRAWINGS

The following describes accompanying drawings in embodiments of this disclosure.

DESCRIPTION OF EMBODIMENTS

Figure 1:
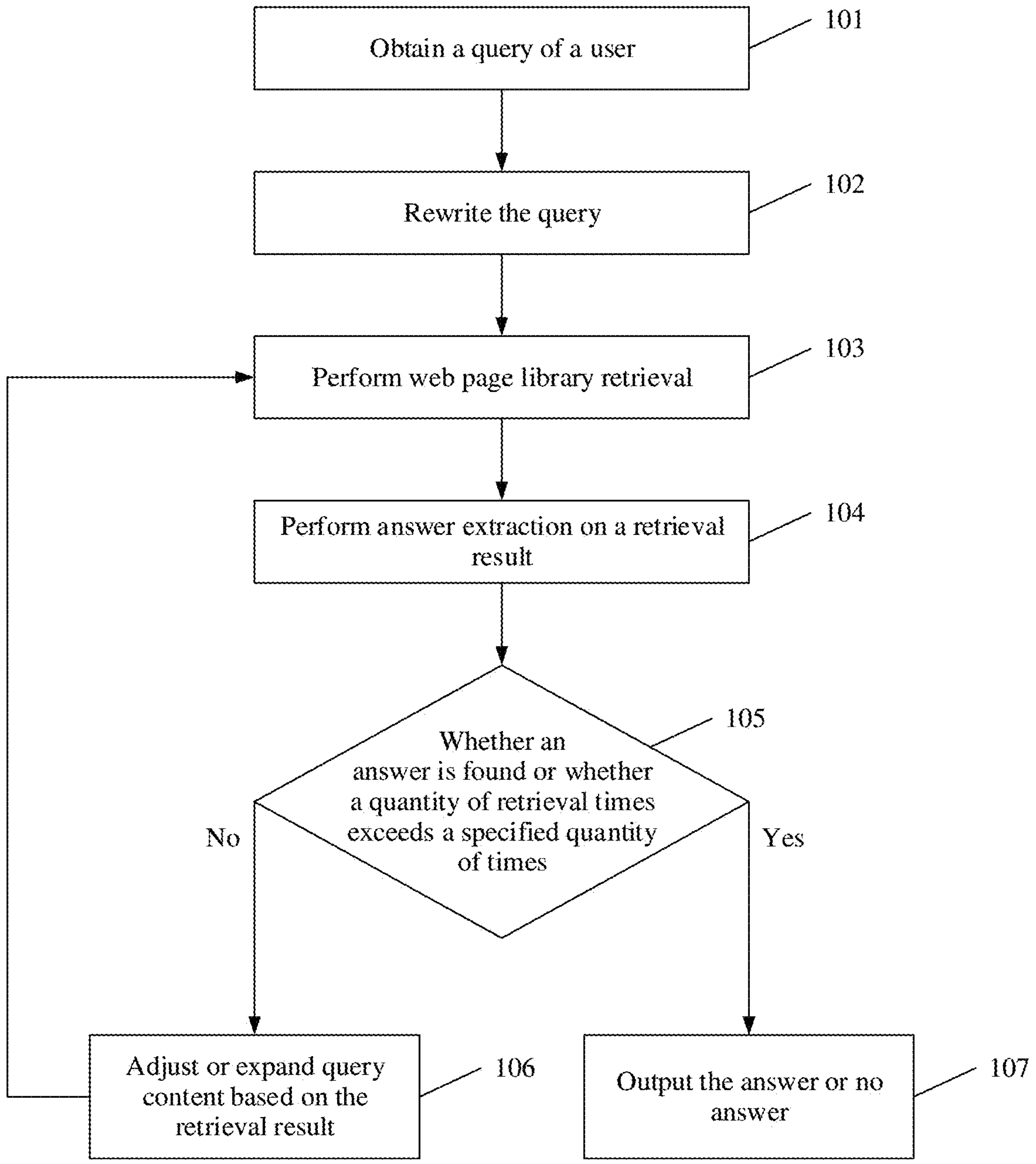
FIG. 1 is a schematic flowchart of an example query method according to an embodiment of this disclosure.

First, some technical terms in embodiments of this disclosure are described, so that persons skilled in the art can understand this disclosure.

Query: A query is search content input by a user in a computer search process. The query may be a question (for example, an interrogative sentence), a keyword, a paragraph, or the like.

Inductive reasoning: Inductive reasoning is a special-to-general reasoning method, and an interpretation method of deriving general theories and principles from special cases by changing opinions on special things to opinions on a large scope.

Deductive reasoning: Deductive reasoning is a general-to-special reasoning method, and is relative to inductive reasoning. A relationship between a premise and a conclusion is inevitable, and deductive reasoning is a kind of definite reasoning.

Syllogism: A syllogism is deductive reasoning that uses two property judgments that include a common term as premises and draws a new property judgment as a conclusion. The syllogism is a general model of deductive reasoning, and includes a major premise, a minor premise, and a conclusion. The major premise is known general knowledge (or information). The minor premise is a special knowledge (or information) studied. It should be understood that specialty herein is relative to the general knowledge in the major premise. The conclusion is a judgment made on the special knowledge based on the general knowledge. Major premise: A major premise is a premise of general knowledge included in deductive reasoning.

Major premise evidence: A major premise evidence is basis for proving a major premise, or in other words, is information confirming major premise description.

Minor premise: A minor premise is a premise of special knowledge included in deductive reasoning.

Minor premise evidence: A minor premise evidence is basis for proving a minor premise, or in other words, is information confirming minor premise description.

For example, "fruit can be eaten" is a major premise, and "peach is fruit" may be considered as a minor premise. Herein, it may be considered that the fruit is general knowledge, the peach is special knowledge, and "peach can be eaten" can be considered as a conclusion drawn from the major premise and the minor premise. Content in a web page or an encyclopedia that records knowledge related to the major premise "fruit can be eaten" may be considered as a major premise evidence for the major premise, and content in a web page or an encyclopedia that records knowledge related to the minor premise "peach is fruit" may be considered as a minor premise evidence for the minor premise.

Knowledge graph: A knowledge graph is a structured semantic knowledge base for describing concepts of things and relationships between the things.

Semantic representation model: A semantic representation model is a deep learning-based representation model, and a main function of the representation model is to obtain a vector representation of a text.

Web page library: A web page library is a database that accommodates a large quantity of internet web pages.

Web page library retrieval: Web page library retrieval is retrieving and searching for related web page information in a web page library based on a provided query and returns the information.

Multi-hop query: A multi-hop query indicates that a result web page that answers a query cannot be obtained through one-time retrieval in a web page library. The query can be answered only after continuous retrieval on web page information obtained based on previous retrieval. One-time retrieval is one hop, and multiple-continuous-time retrieval is multiple hops.

Common sense query: A common sense query is a query that requires common sense information as a support.

Opinion query: An opinion query indicates that a query result requires not only a support of common sense, and is not only a plurality of echoing results but an answer, with an opinion, provided based on an observed web page evidence and common sense obtained through inductive reasoning.

Formal query: In a formal query, compared with that in a natural statement query, a query is converted into a structured statement and a missing part of a query structure is queried and supplemented.

User context information: User context information is user related information such as a user profile, a user environment, a search status, and historical behavior.

Term and concept: A term and concept are a basic unit of logic analysis. In conventional logic, the term and concept are a subject and a predicate of a proposition. The term and concept that can be used as the subject and the predicate of the proposition is referred to as a concept.

Term graph: A term graph is a directed connected graph constructed by combining terms and concepts and a same-sentence relationship.

Negative example: To show that a proposition is a false proposition, an example may be given to make it meet a condition of the proposition but not a conclusion of the proposition. Such an example is referred to as a negative example or a counter example.

Second, related technologies in embodiments of this disclosure are described, to further analyze technical queries to be resolved in this disclosure.

Related Technology 1

FIG. 1 is a schematic flowchart of an example query method according to an embodiment of this disclosure. The query method is applied to a query system, and the query method includes the following steps.

101: Obtain a query of a user.

102: Rewrite the query.

Rewriting the query may include core word identification, synonym expansion/replacement, query pattern conversion (conversion from a rare pattern to a common pattern), and the like.

103: Perform web page library retrieval.

That is, retrieval is performed in a web page library based on a rewritten query.

104: Perform answer extraction on a retrieval result.

For example, for the retrieval result obtained through retrieval in the web page library, that is, for web page information obtained through retrieval based on the foregoing query, answer extraction is performed, and extracted answers are sorted.

105: Determine whether an answer is found or whether a quantity of retrieval times exceeds a specified quantity of times.

Specifically, if an answer ranking first in the foregoing sorting cannot answer the query, or the quantity of retrieval times of the current query does not exceed the specified quantity of times, step 106 is performed; or if an answer ranking first in the foregoing sorting can answer the query, or the quantity of retrieval times of the current query exceeds the specified quantity of times, step 107 is performed.

106: Adjust or expand query content based on the retrieval result.

Specifically, adjusting or expanding the query content based on the web page information returned by the retrieval is generally adding, on the basis of the current query content, a keyword obtained by the current retrieval, and using the keyword and the current query content as query content of next retrieval.

107: Output the answer or no answer.

That is, the extracted answer or no answer is returned to the user.

It can be learned from FIG. 1 that, in Related technology 1, a multi-hop query problem is resolved through multiple-retrieval. However, only retrieval-based path search is performed, and a provided retrieval path has no explainability. As a result, that an answer is correct but the retrieval path is incorrect easily occurs, to be specific, a correct answer is happened to be found. In addition, it is still difficult to provide a correct answer for a common sense query.

Reasons, for the foregoing disadvantages, obtained through analysis are as follows: Related technology 1 is simple information search, and lacks a reasoning capability. However, similar to the common sense query, some knowledge that supports a query answer usually does not simply exist in web page information, but can be obtained only through specific reasoning. Therefore, in Related technology 1, it is difficult to provide the correct answer to the common sense query, and the answer has no explainability.

Related Technology 2

Figure 2:
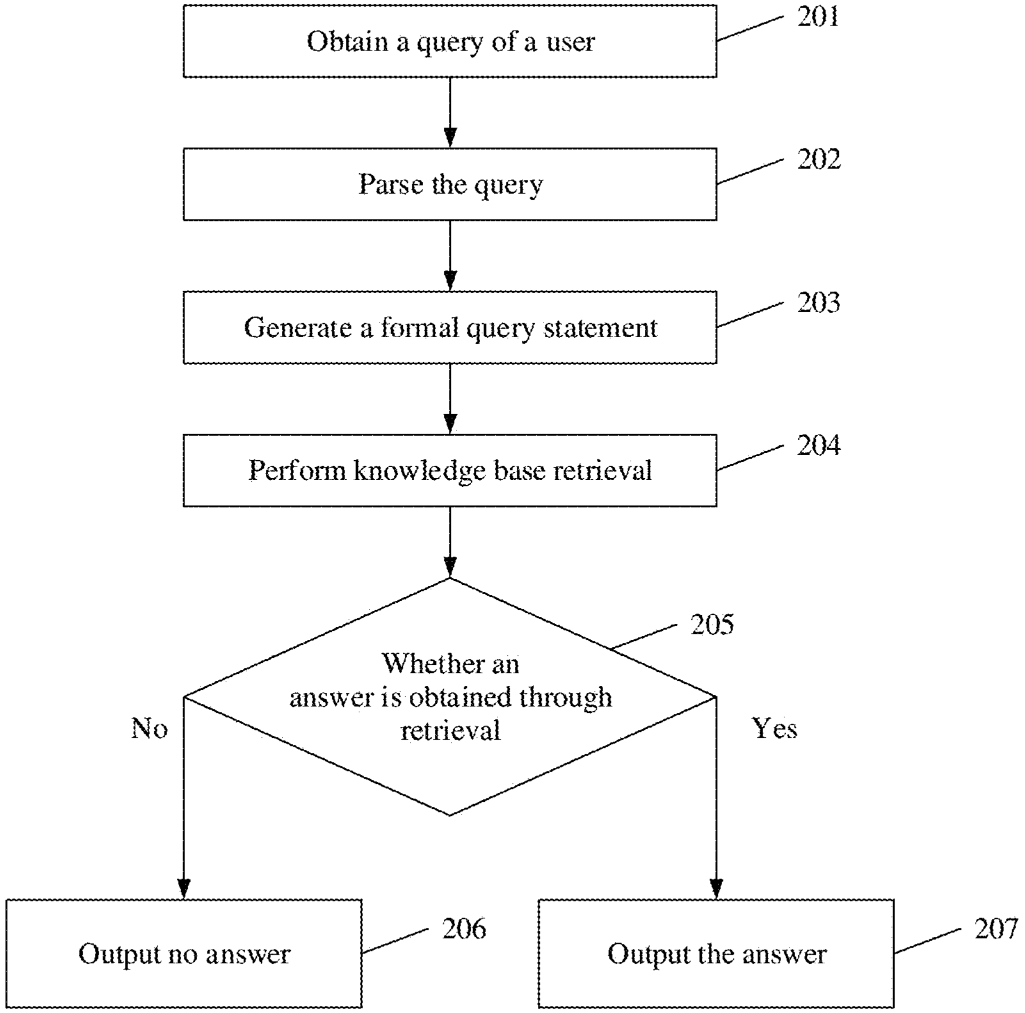
FIG. 2 is a schematic flowchart of another example query method according to an embodiment of this disclosure.

FIG. 2 is a schematic flowchart of another example query method according to an embodiment of this disclosure. The query method is applied to a query system, and the query method includes the following steps.

201: Obtain a query of a user.

202: Parse the query.

Parsing the query may include core entity recognition, syntax parsing, and the like.

203: Generate a formal query statement.

Specifically, a natural statement of the query is converted into the graph-query-based formal statement (for example, SPARQL) based on a parsing result in step 202. For a query with a complex query component, the query may be first split into subqueries, then the subqueries are used to generate corresponding formal statements, and then the formal statements corresponding to the subqueries are combined into a complex formal statement.

204: Perform knowledge base retrieval.

Specifically, result retrieval is performed, based on the formal statement generated in step 203, on a static knowledge graph constructed offline.

205: Determine whether an answer is obtained through retrieval.

If no answer is obtained through retrieval, step 206 is performed; or if the answer is obtained through retrieval, step 207 is performed.

206: Output no answer.

207: Output the answer.

It can be learned from FIG. 2 that whether a correct result can be provided in Related technology 2 depends on correct parsing of the query statement to a large extent. If parsing is incorrect, the correct answer cannot be obtained through retrieval. The knowledge graph is static, and a correct answer cannot be provided for a new query or a common sense query that is not included in the knowledge graph. The provided answer has no explainability.

Reasons, for the foregoing disadvantages, obtained through analysis are as follows: Related technology 2 is still simple information search; and although different from Related technology 1, Related technology 2 is a formal search, but still lacks a reasoning capability. For the new query and the common sense query, some knowledge required to support a query answer is usually not included in the knowledge graph, and answers can be obtained only after specific reasoning is performed. Therefore, it is difficult to provide the correct answers to the new query and the common sense query in Related technology 2, only simple answer presentation is provided, and the answer has no explainability.

In conclusion, the technical queries to be resolved in this disclosure include but are not limited to the following:

(1) A query system lacks a reasoning capability and cannot effectively answer a common sense or opinion query.

(2) The query system is weak in processing a complex query, can only search for an answer through retrieval, and cannot answer the query by using new knowledge created through induction or reasoning.

(3) The query system lacks explainability. For the complex query or common sense query, if the answer can be provided, only simple answer can be provided, and an explainable answer process cannot be provided.

The following describes technical solutions provided in this disclosure in detail with reference to specific implementations.

Figure 3:
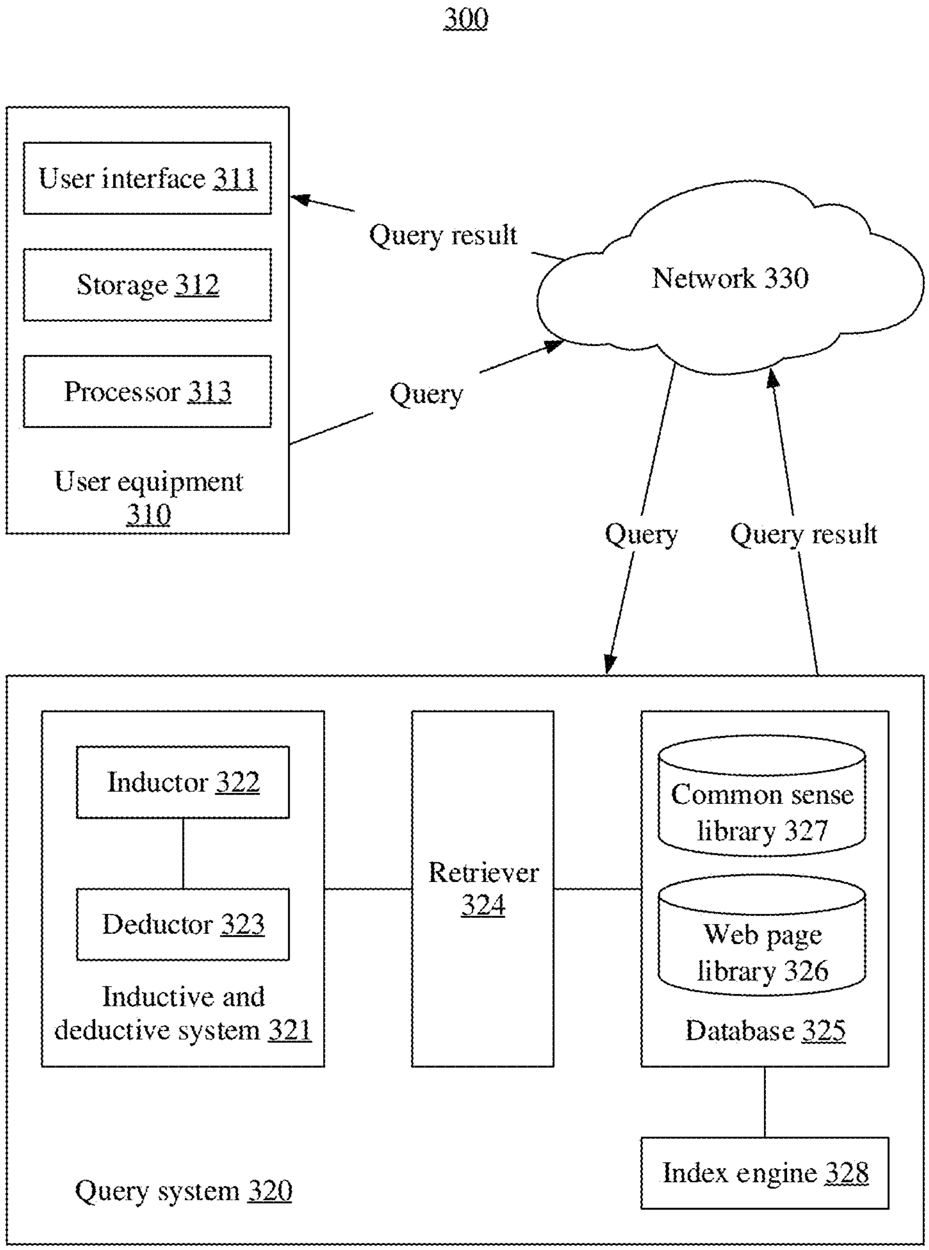
FIG. 3 is a diagram of an architecture of an example system 300 for computer search according to an embodiment of this disclosure.

FIG. 3 is a diagram of an architecture of an example system 300 for computer search according to an embodiment of this disclosure. The system 300 includes a user equipment 310, a query system 320, and a network 330. A user operates the user equipment 310 and inputs a query on the user equipment 310. The user equipment 310 sends the query to the query system 320 through the network 330. The query system 320 performs evidence retrieval, inductive reasoning, deductive reasoning, and the like to obtain a query result, and sends the query result to the user equipment 310 through the network 330. The user equipment 310 feeds back the query result to the user.

The user equipment 310 includes a User Interface (UI) 311, a storage 312, and a processor 313. The storage 312 may be a Random Access Memory (RAM). The user interface 311 may be configured to receive a query and present a query result. The query result includes an answer to the query, an inductive and deductive reasoning process, and the like. This can improve query credibility and explainability.

The query system 320 includes an inductive and deductive system 321, a retriever 324, a database 325, and an index engine 328. The inductive and deductive system 321 includes an inductor 322 and a deductor 323. In an example embodiment, the database 325 may be a database outside the query system 320, that is, the query system 320 does not include the database 325. The database 325 includes a web page library 326 and a common sense library 327. The database 325 is configured to quickly search for evidence information. The web page library 326 is indexes constructed based on a general web page, and is for major and minor premise evidence retrieval. The common sense library 327 is indexes constructed based on common sense obtained through induction, and is used to provide common sense information. The common sense information is a major premise obtained through pre-inductive reasoning. The index engine 328 is a set of engineering algorithm engines for constructing the web page library 326 and the common sense library 327. The retriever 324 is configured to retrieve a major premise evidence from the database 325. The inductor 322 is configured to obtain a major premise through inductive reasoning based on a major premise evidence. The retriever 324 is further configured to retrieve a minor premise evidence from the web page library 326, to generate a minor premise. The deductor 323 is configured to perform deductive reasoning based on a major premise and a minor premise, to obtain an answer to a query. Detailed descriptions are provided below.

The retriever 324 may be a neural network model. Specifically, the retriever 324 may implement at least the following functions:

(1) Major premise evidence retrieval: For a query, the retriever 324 is capable of automatically selecting an appropriate major premise evidence from massive web pages in the web page library 326, and retrieve appropriate common sense information from the common sense library 327. After the retriever 324 is combined with the inductor 322, internet knowledge can be freely obtained.

It should be noted that, in a process of performing major premise evidence retrieval, the retriever 324 may further retrieve direct evidence for proving an answer to the query.

(2) Minor premise evidence retrieval: After the major premise is generated by the inductor 322, the retriever 324 can automatically retrieve a minor premise evidence from the web page library 326.

In an example embodiment, the query system 320 may further include a generator (not shown in FIG. 3). The generator is a generation model, and inputs a segment of natural language text and outputs another segment of natural language text. In this disclosure, the text output by the generator serves as a minor premise for deductive reasoning. The minor premise evidence obtained by the retriever 324 through retrieval may be sent to the generator. This facilitates generation of the minor premise for deductive reasoning. This supplements a deductive reasoning path.

In this disclosure, the retriever 324 retrieves the major premise evidence for the query, and inputs the major premise evidence obtained through retrieval into the inductor 322 for inductive reasoning, to obtain the major premise; and further retrieves the minor premise evidence, and inputs the minor premise evidence obtained through retrieval into the generator, to obtain the minor premise. Therefore, the query system 320 automatically supplements the reasoning path of deductive reasoning.

The inductor 322 may be a neural network model. Specifically, the inductor 322 may implement at least the following functions:

(1) Online induction: The inductor 322 may perform inductive reasoning based on the major premise evidence obtained by the retriever 324 through retrieval, to obtain the major premise. This implements on-demand induction, and avoids queries such as difficult expansion and insufficient coverage in a static graph.

(2) Negative example induction: The retriever 324 may further obtain a negative example of the major premise evidence through retrieval. The inductor 322 separately performs inductive reasoning on the major premise evidence and the negative example of the major premise evidence, and determines whether a result obtained through inductive reasoning on the major premise evidence conflicts with a result obtained through inductive reasoning on the negative example of the major premise evidence. If the result obtained through inductive reasoning on the major premise evidence does not conflict with the result obtained through inductive reasoning on the negative example of the major premise evidence, the result obtained through inductive reasoning on the major premise evidence is used as a major premise of deductive reasoning. If the result obtained through inductive reasoning on the major premise evidence conflicts with the result obtained through inductive reasoning on the negative example of the major premise evidence, a major premise evidence needs to be re-retrieved, and negative example induction is performed based on the major premise evidence obtained through re-retrieval.

For example, for any major premise evidence A, the retriever 324 may further obtain a negative example of the major premise evidence A through retrieval. The inductor 322 performs inductive reasoning on the major premise evidence A to obtain a major premise A1. The inductor 322 performs inductive reasoning on the negative example of the major premise evidence A, to obtain a major premise A2. If the major premise A1 does not conflict with the major premise A2, the major premise A1 may be for deductive reasoning. If the major premise A1 conflicts with the major premise A2, the retriever 324 re-retrieves a major premise evidence, for example, obtains a major premise evidence B through re-retrieval; and obtains a negative example of the general premise evidence B through retrieval. Negative example induction is performed based on the major premise evidence B and the negative example of the major premise evidence B.

In an example embodiment, the query system 320 may further include a condition phase container (not shown in FIG. 3). The condition phase container is a discriminant model for determining whether two input conclusions are compatible (consistent or non-conflicting) or conflict. In this way, when performing negative example induction, the inductor 322 may input, into the condition phase container, the result obtained through inductive reasoning based on the major premise evidence and the result obtained through inductive reasoning based on the negative example of the major premise evidence, to determine whether the two results conflict.

The inductor 322 obtains the major premise for deductive reasoning in a negative example induction manner. In this way, the inductor 322 has high accuracy and credibility, adapts to a feature of noisy and different internet information, and imitates a human cognitive development process, that is, a process of continuously correcting information that is newly input and that is not expected.

(3) Long-term and short-term memory induction: The inductor 322 is further configured to perform knowledge memory on the major premise obtained through inductive reasoning. That is, the inductor 322 performs knowledge memory on the major premise obtained through induction as common sense information. Knowledge memory can balance long-term memory and short-term memory. The long-term memory is stored in the common sense library 327 and may be continuously updated. The short-term memory is related to a query of a user and is stored in a neural unit group, and the neural unit group is a group of neural networks in the inductor 322. This can help the inductor 322 obtain required common sense information in an inductive reasoning process.

In an example embodiment, the inductor 322 may further extract common sense information from an internet (for example, the web page library 326) through offline reasoning, and store the common sense information in the common sense library 327 as long-term memory of the query system.

In this disclosure, the inductor 322 continuously induces higher-level common sense information from the internet (for example, the web page library 326), and continuously corrects, by using a negative example induction method, historically induced common sense information, to improve accuracy of the common sense information. For a specific query scenario, induction may be performed with reference to long-term and short-term memory and information retrieved from the internet (for example, the web page library 326), to provide a common sense information query support.

In an example embodiment, the query system 320 may further include an action selector (not shown in FIG. 3). The action selector may be a neural network model. The action selector scores a premise combination in a reinforcement learning manner. It should be noted that the inductor 322 may generate a plurality of major premises, and the generator may generate a plurality of minor premises. The query system 320 combines each minor premise with each major premise to obtain a plurality of premise combinations. The query system 320 inputs the plurality of premise combinations into the action selector. The action selector scores each premise combination, and sorts the plurality of premise combinations based on a score status, so as to select a most appropriate premise combination and input the premise combination into the deductor 323. This can not only form an explicit reasoning path, but also select an optimal reasoning path to generate an answer.

The deductor 323 may be a neural network model. Specifically, the deductor 323 may implement at least the following functions.

(1) Deduction of a feedback signal in real time The action selector may receive the feedback signal, and optimize and adjust selection of the premise combination, so that larger positive feedback is subsequently obtained. The feedback signal includes a feedback signal from the user and a feedback signal from the answer verification module. The feedback signal from the user is feedback from the user for the answer presented on the user interface 311, for example, an incorrect feedback result presented in an explicit manner, or Tap/Do not tap presented in an implicit t manner. The answer verification module may be a neural network model. The answer verification module is configured to determine whether an output answer conforms to factual logic. For example, each time after the deductor 323 performs deductive reasoning, the user interface 311 presents an answer to the current deductive reasoning, and the user may use the answer to the current deductive reasoning as feedback, to send a feedback signal to the action selector. In addition, the answer verification module also verifies the answer to the current deductive reasoning, and sends a feedback signal to the action selector. After receiving the feedback signal from the user and the feedback signal from the answer verification module, the action selector adjusts a premise combination for performing deductive reasoning, reselects a most appropriate premise combination, and inputs the premise combination into the deductor 323. The deductor 323 then performs deductive reasoning on the reselected premise combination. This can adjust selection of the premise combination of deductive reasoning in real time based on the feedback from the user and the feedback from the answer verification module on the deductive reasoning answer, improve an effect optimization speed of the query system, and continuously improve deductive reasoning effect.

(2) Enhancement of a deductive model based on a term graph representation A premise combination is a free text. The query system 320 may convert the premise combination into a term graph, and then input the term graph obtained through conversion into the deductor 323 for deductive reasoning. For example, the query system 320 may convert a premise combination in a form of a free text into a term graph. In this way, the free text is represented as the term graph as an input of deductive reasoning, so that the deductor 323 directly models a free text logical relationship, thereby improving perception of the deductor 323 on the text logical relationship. In addition, a logical relationship pre-training method may be used to enable the deductor 323 to perceive a conjunction relationship in advance, thereby effectively improving a deductive reasoning capability of the deductor 323 for the free text.

(3) Adjustment of a model parameter The deductor 323 may calculate a loss based on term graph coding and syllogism text coding, and adjust the model parameter of the deductor 323 based on the loss obtained through calculation. The term graph coding is a coding representation of a term graph. The syllogism text coding is a coding representation of a syllogism text. To be specific, the syllogism text is obtained by splicing a major premise text, a minor premise text, and an answer text, and then a coding representation is performed. For example, in a deductive reasoning process, the query system 320 converts a premise combination into a term graph, and uses the term graph as an input of the deductor 323 to obtain an answer. In addition, the query system 320 may perform a coding representation on the term graph, to obtain term graph coding corresponding to the term graph. In addition, the query system 320 splices a major premise and a minor premise in the premise combination and the answer of deductive reasoning into a syllogism text, and performs a coding representation on the syllogism text, to obtain syllogism text coding corresponding to the syllogism text. Then, the query system 320 may calculate a loss based on the term graph coding and the syllogism text coding, and adjust a model parameter of the deductor 323 based on the loss obtained through calculation.

In the system shown in FIG. 3, in an offline phase, the common sense information may be continuously obtained through retrieval and induction from the internet information by the inductor 322, the retriever 324, and the web page library 326, and the common sense library 327 is constructed or updated. In an online phase, after the user inputs the query in the user interface 311, the system retrieves both the web page library 326 and the common sense library 327, to obtain the major premise evidence, and sends the major premise evidence obtained in the web page library 326 and the common sense library 327 to the inductor 322 for inductive reasoning, to obtain the major premise. After obtaining the major premise through inductive reasoning, the system further retrieves the web page library 326, to obtain the minor premise that supports the reasoning path. Then, the system sends the major premise and the minor premise to the deductor 323 for deductive reasoning, to obtain the answer to the query. After the answer is verified, a query interface is presented in the user interface 311. In addition to the answer, the query interface further presents a reasoning process of the query.

Figure 4:
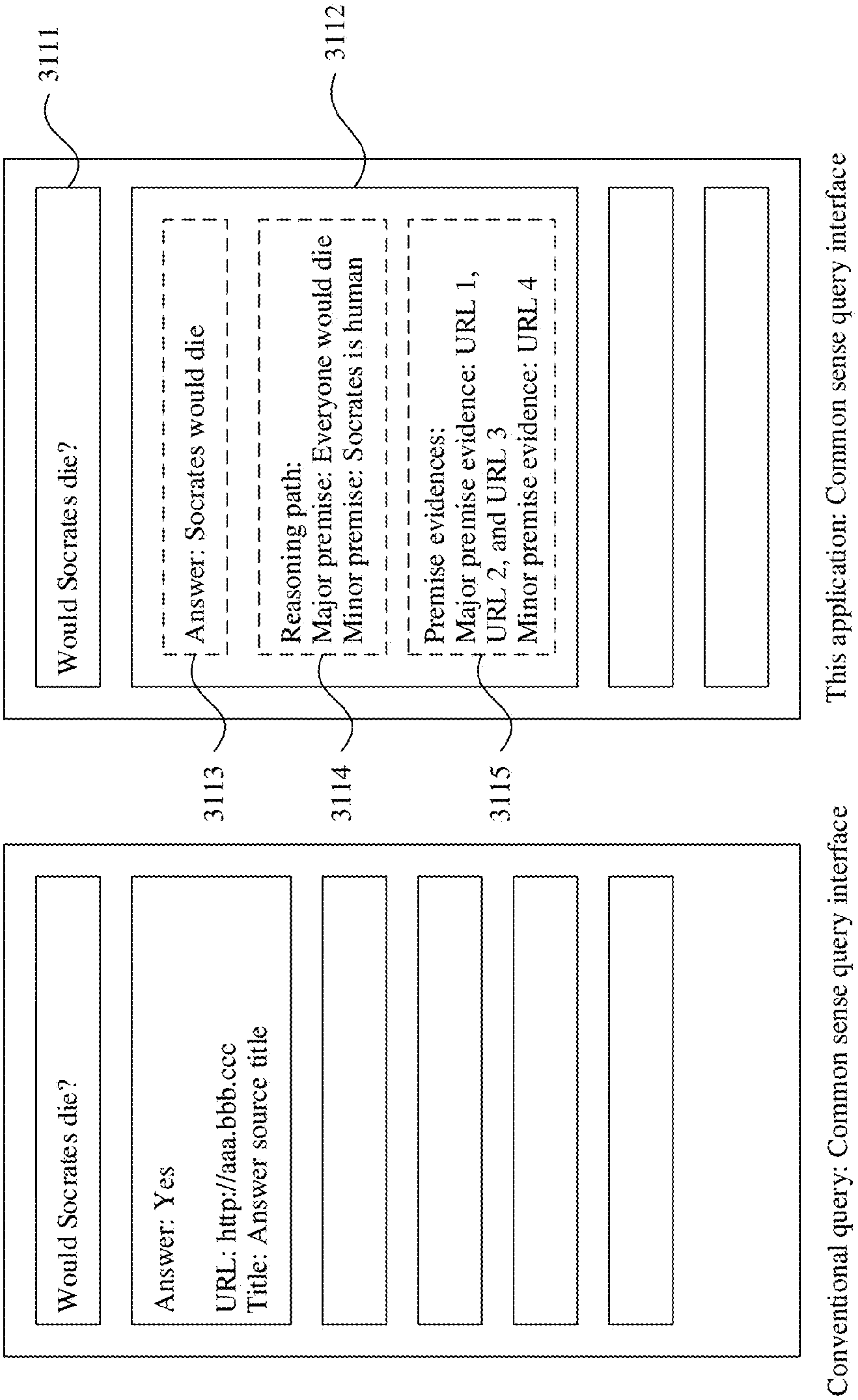
FIG. 4 is a diagram of comparison between an example conventional common sense query interface and an example common sense query interface according to an embodiment of this disclosure.

FIG. 4 is a diagram of comparison between an example conventional common sense query interface and an example common sense query interface according to an embodiment of this disclosure. The conventional common sense query interface presents only a query, an answer, an answer source title, and a web page address (for example, URL). The common sense query interface according to this disclosure includes the following elements: a query input box 3111, a query card 3112, an answer presentation box 3113, a reasoning path presentation box 3114, and a premise evidence presentation box 3115. The query input box 3111 is used to input and present a query, for example, "Would Socrates die?". The answer presentation box 3113 presents an answer to the query in the query input box 3111, for example, "Socrates would die". The reasoning path presentation box 3114 presents a reasoning path for obtaining, through inductive and deductive reasoning, the answer presented in the answer presentation box 3113, and the reasoning path includes a major premise and a minor premise. A major premise evidence is used to inductively reason a major premise, and a minor premise evidence is used to generate a minor premise. For example, "Major premise: Everyone would die" and "Minor premise: Socrates is human". The premise evidence presentation box 3115 presents evidences (for example, web page addresses) of inductive and deductive reasoning presented in the reasoning path presentation box 3114, and the evidences include the major premise evidence and the minor premise evidence, for example, "Major premise evidence: URL 1, URL 2, and URL 3" and "Minor premise evidence: URL 4".

Figure 5:
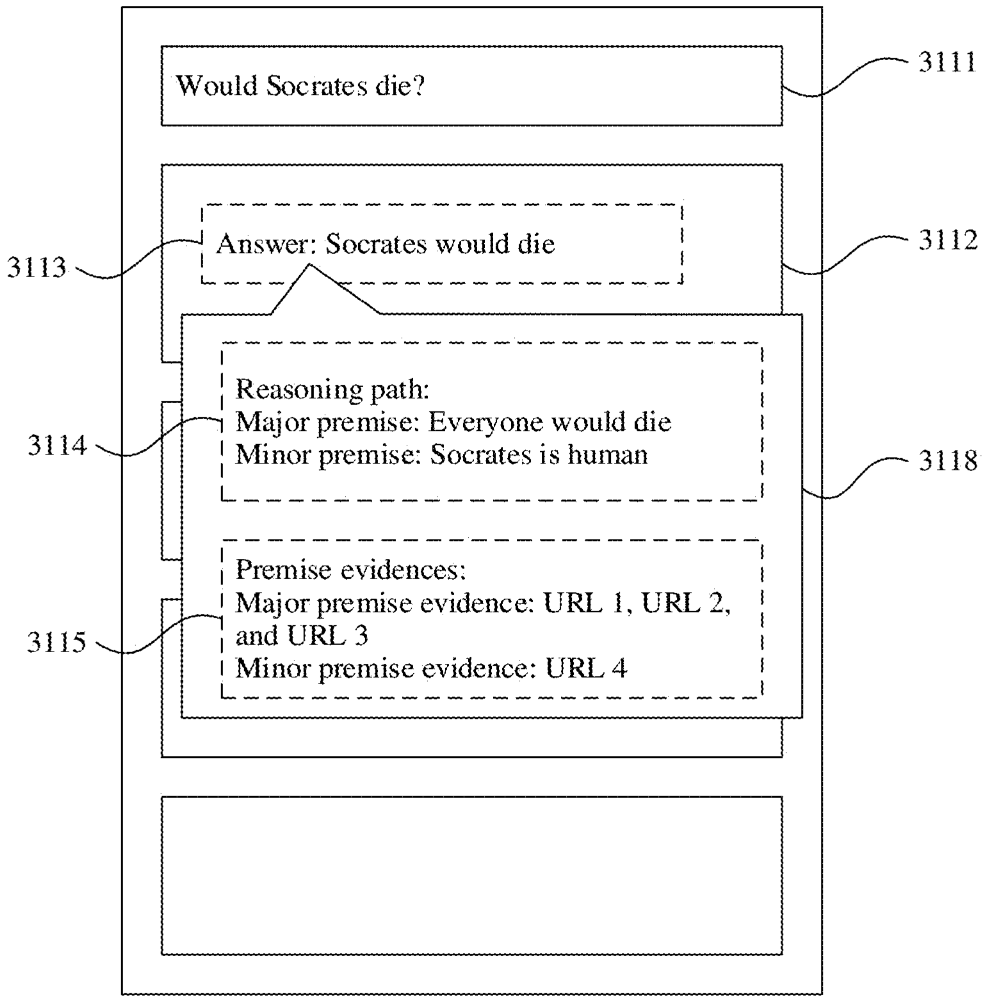
FIG. 5 is a diagram of an example common sense query interface according to an embodiment of this disclosure.

It should be noted that elements in the common sense query interface shown in FIG. 4 are presented in a tiled manner, or may be presented in a selection pop-up manner shown in FIG. 5 or in another manner. The reasoning path presentation box 3114 and the premise evidence presentation box 3115 in FIG. 5 are in a pop-up query card 3118. This is not limited in this disclosure.

Figure 6:
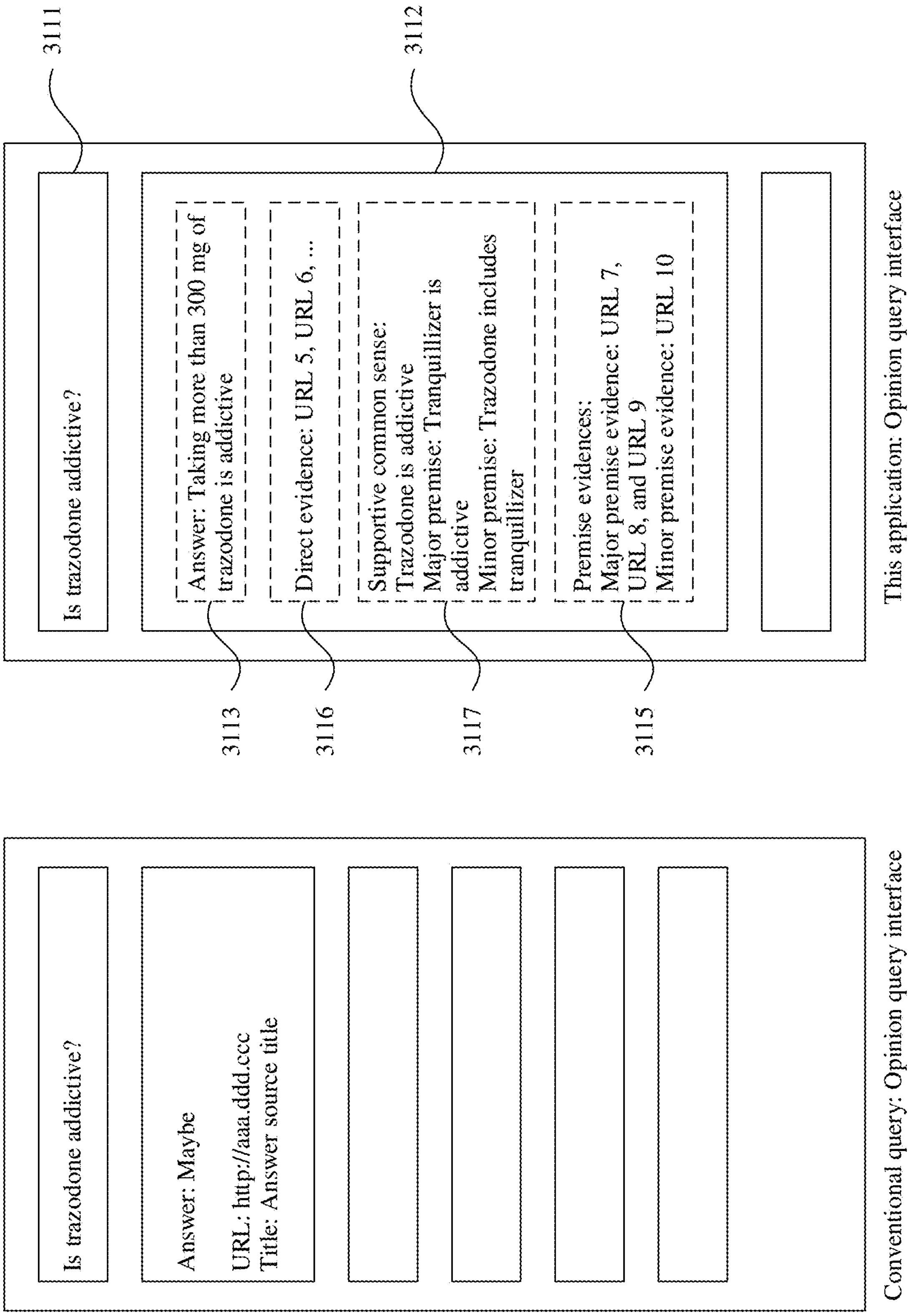
FIG. 6 is a diagram of comparison between a conventional opinion query interface and an opinion query interface according to an embodiment of this disclosure.

FIG. 6 is a diagram of comparison between a conventional opinion query interface and an opinion query interface according to an embodiment of this disclosure. The conventional opinion query interface presents only a query, an answer, an answer source title, and a web page address. The opinion query interface according to this disclosure includes the following elements: a query input box 3111, a query card 3112, an answer presentation box 3113, a premise evidence presentation box 3115, a direct evidence presentation box 3116, and a common sense and reasoning path presentation box 3117. The query input box 3111 is used to input and present a query, for example, "Is trazodone addictive?". The answer presentation box 3113 presents an answer to the query in the query input box 3111, for example, "Taking more than 300 mg of trazodone is addictive". The direct evidence presentation box 3116 presents a direct evidence (for example, web page addresses) that proves the answer presented in the answer presentation box 3113, for example, "Direct evidence: URL 5, URL 6, and the like". The direct evidence may be obtained through retrieval when the retriever 324 retrieves a major premise evidence. The common sense and reasoning path presentation box 3117 presents a reasoning path and supportive common sense (common sense information) of the answer presented in the answer presentation box 3113, where the reasoning path includes a major premise and a minor premise, for example, "Supportive common sense: Trazodone is addictive", "Major premise: Tranquillizer is addictive", and "Minor premise: Trazodone includes tranquillizer". The premise evidence presentation box 3115 presents evidences (for example, web page addresses) for supporting inductive and deductive reasoning presented in the common sense and reasoning path presentation box 3117, and the evidences include the major premise evidence and a minor premise evidence, for example, "Major premise evidence: URL 7, URL 8, and URL 9" and "Minor premise evidence: URL 10".

It should be noted that elements in the opinion query interface shown in FIG. 6 may also be presented in a selection pop-up manner or in another manner. This is not limited in this disclosure. It should be further noted that the URL 1 to the URL 10 represent content in web pages corresponding to web page addresses.

In this disclosure, the inductive and deductive system 321 gives the query system 320 a capability of inducing common sense and performing reasoning based on the common sense. This can better answer a complex query that is about common sense or requires reasoning. The query system 320 performs deductive reasoning based on the major premise and the minor premise, and provides the answer to the query and the reasoning path of the answer. In addition, the query system 320 presents the reasoning process in the user interface, so that the reasoning process of the answer has explainability. This enhances credibility and explainability of the query system 320.

Figure 7:
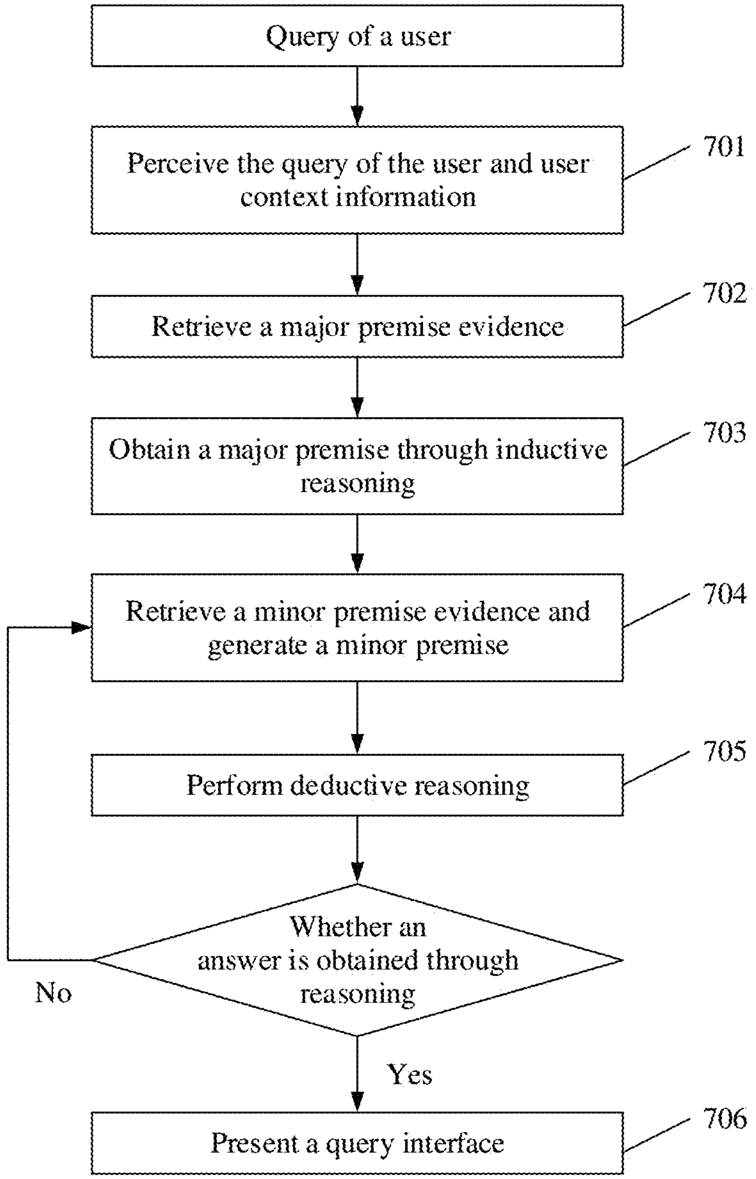
FIG. 7 is a schematic flowchart of executing a query by the system 300 shown in FIG. 3.

FIG. 7 is a schematic flowchart of executing a query by the system 300 shown in FIG. 3. A procedure includes but is not limited to the following steps.

701: Perceive the query of a user and user context information.

Specifically, after the user inputs the query in the user equipment 310, the user equipment 310 sends the query and the user context information to a unified Application Programming Interface (API), and converts, by using a semantic representation model, the query and a text of the user context information into a vector representation, to obtain a first vector.

702: Retrieve a major premise evidence.

Specifically, the retriever 324 searches, based on the first vector, the web page library 326 for a related evidence web page, to obtain the major premise evidence. The major premise evidence obtained through retrieval in the web page library 326 may be grouped, so that a plurality of major premises are obtained through inductive reasoning in step 703.

In addition, the retriever 324 may further retrieve the common sense library 327 based on the first vector, to obtain common sense information. The common sense information obtained through retrieval in the common sense library 327 and the major premise evidence obtained through retrieval may be input into an inductor together, to assist the inductor in performing inductive reasoning, so as to obtain a more accurate major premise. In addition, the common sense information obtained through retrieval in the common sense library 327 may also be directly used as a major premise for deductive reasoning.

703: Obtain the major premise through inductive reasoning.

Specifically, the inductor 322 may perform inductive reasoning based on the major premise evidence obtained through retrieval in step 702, to obtain the major premise. It should be understood that, for one query, the inductor 322 may perform inductive reasoning to obtain one or more major premises.

In an example embodiment, for the major premise evidence for obtaining any major premise through induction, the retriever 324 may obtain a negative example of the major premise evidence through retrieval. The inductor 322 performs negative example induction based on the major premise evidence and the negative example of the major premise evidence, to obtain the major premise.

In an example embodiment, the inductor 322 stores, in the common sense library 327, the major premise obtained through inductive reasoning. When performing online induction, the inductor 322 may obtain common sense information from the common sense library 327 for online induction, to assist the inductor 322 in performing better induction.

704: Retrieve a minor premise evidence and generate a minor premise.

Specifically, the major premise generated through inductive reasoning by the inductor 322, the query, and the user context information are represented as a second vector by using the semantic representation model. It should be noted that, because there may be a plurality of major premises, each major premise, the query, and the user context information are represented as one second vector. Therefore, there are a plurality of second vectors, and each of the plurality of second vectors is used to retrieve a corresponding minor premise evidence. The retriever 324 retrieves the minor premise evidence from the web page library 326 based on the second vector, and inputs the query, the user context information, the major premise, and the minor premise evidence obtained through retrieval into the generator to generate the minor premise.

705: Perform deductive reasoning.

Specifically, the retriever 324 may combine each minor premise with each major premise to obtain a plurality of premise combinations. The action selector selects a most appropriate premise combination from the plurality of premise combinations, and inputs the premise combination into the deductor 323 for deductive reasoning. After the deductor 323 performs deductive reasoning each time, if an answer is obtained through deductive reasoning, step 706 is performed; otherwise, step 704 is performed.

In an example embodiment, after the deductor 323 performs deductive reasoning each time, the action selector receives a feedback signal from the user and a feedback signal from the answer verification module, adjusts and selects a most appropriate premise combination, and re-inputs the premise combination into the deductor 323, to expect to obtain positive feedback, that is, to obtain a more accurate answer.

In an example embodiment, the query system 320 may convert the premise combination into a term graph, and then input the term graph obtained through conversion into the deductor 323 for deductive reasoning. In this way, a free text is represented as the term graph as an input of deductive reasoning, so that the deductor 323 directly models a free text logical relationship, thereby improving perception of the deductor 323 on the text logical relationship. In addition, a logical relationship pre-training method may be used to enable the deductor 323 to perceive a conjunction relationship in advance, thereby effectively improving a deductive reasoning capability of the deductor 323 for the free text.

In an example embodiment, in a deductive reasoning process, the query system 320 converts the premise combination into the term graph, and uses the term graph as an input of the deductor 323. In addition, the query system 320 may perform a coding representation on the term graph, to obtain term graph coding corresponding to the term graph. In addition, the query system 320 splices a major premise and a minor premise in the premise combination and the answer of deductive reasoning into a syllogism text, and performs a coding representation on the syllogism text, to obtain syllogism text coding corresponding to the syllogism text. Then, the query system 320 may calculate a loss based on the term graph coding and the syllogism text coding, and adjust a model parameter of the deductor 323 based on the loss obtained through calculation.

706: Present a query interface.

Specifically, the query interface is presented in the user interface 311. In addition to the answer to the query, the query interface further presents a reasoning process of the query. For example, content presented in the query interface includes the query, the answer, the major premise, the minor premise, the major premise evidence, the minor premise evidence, supportive common sense, a direct evidence, and the like. For details, refer to FIG. 4 to FIG. 6.

It should be noted that, for descriptions of the embodiment shown in FIG. 7, refer to the descriptions of embodiments shown in FIG. 3 to FIG. 6.

Figure 8:
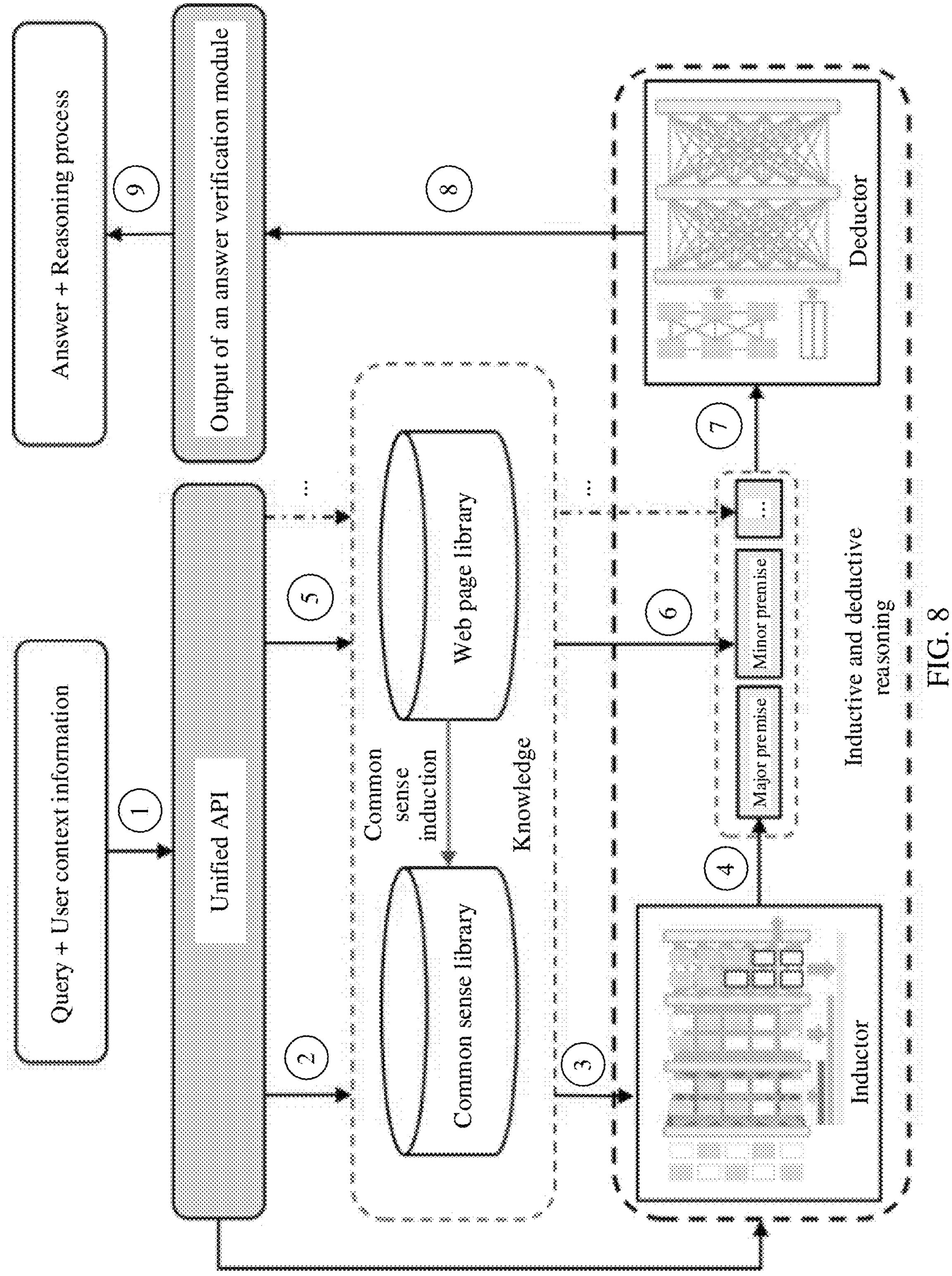
FIG. 8 is a schematic flowchart of a specific example of executing a query by the system 300 shown in FIG. 3.

FIG. 8 is a schematic flowchart of a specific example of executing a query by the system 300 shown in FIG. 3. A procedure includes but is not limited to the following steps.

Step ①: Obtain a query of a user and perceive user context information, and generate a vector representation of the query of the user and the user context information by using a semantic representation model on a unified API, to obtain a first vector.

For example, the query of the user is "What to wear tomorrow?". The query "What to wear tomorrow?" and the user context information are input into the semantic representation model, and the semantic representation model outputs the first vector. The user context information includes personalized information related to the user, for example, an occupation and an age.

Step ②: Retrieve a common sense library and a web page library based on the first vector by using a retriever, to respectively obtain common sense information and major premise evidences for inducing major premises.

For example, the common sense information obtained through retrieval based on the first vector is "An overcoat needs to be worn in a snowy day" and "A suit needs to be worn on a workday". The major premise evidences obtained through retrieval is "A formal dress needs to be worn to attend a charity dinner", "A low-profile dress needs to be worn to attend a wedding banquet", "A suit and an address need to be worn to attend a business banquet", and "Casual clothing can be worn to attend a close friend banquet".

Step ③: Input the common sense information and the major premise evidences that are obtained through retrieval in step ② into an inductor for negative example induction, to obtain a plurality of major premises.

For example, "A formal dress needs to be worn to attend a charity dinner", "A low-profile dress needs to be worn to attend a wedding banquet", "A suit and an address need to be worn to attend a business banquet", and "Casual clothing can be worn to attend a close friend banquet" are input into the inductor, to obtain the major premise "A dress needs to be worn to attend a formal banquet".

Step ④: Send the major premises obtained through inductive reasoning in step ③ to the retriever and a deductor, to perform subsequent deductive reasoning.

Step ⑤: Represent the query of the user, the user context information, and the major premises as second vectors by using the semantic representation model.

It should be understood that, because there are a plurality of major premises, there are a plurality of second vectors. In addition, the plurality of second vectors correspond to the plurality of major premises, and any one of the plurality of second vectors indicates the query of the user, the user context information, and a major premise corresponding to the any second vector.

For example, a vector representation is performed by using the semantic representation model on the query "What to wear tomorrow?", the user context information and the major premises "An overcoat needs to be worn in a snowy day", "A suit needs to be worn on a workday", and "A dress needs to be worn to attend a formal banquet", to obtain second vectors corresponding to the major premises.

Step ⑥: Generate a plurality of minor premises after the web page library is retrieved based on the second vector obtained in step ⑤.

For example, based on the second vectors representing the query "What to wear tomorrow?", the user context information and the major premises "An overcoat needs to be worn in a snowy day", "A suit needs to be worn on a workday", and "A dress needs to be worn to attend a formal banquet", the web page library is retrieved and minor premises are generated. The obtained minor premises are "Tomorrow is a snowy day" "Tomorrow is a workday", and "Tomorrow needs to attend a formal banquet".

Step ⑦: Combine each major premise obtained in step ③ with each minor premise obtained in step ⑥ to obtain a plurality of premise combinations, select a most appropriate premise combination from the plurality of premise combinations, and input the premise combination to the deductor for deductive reasoning, to obtain an answer to the query.

For example, the major premises "An overcoat needs to be worn in a snowy day", "A suit needs to be worn on a workday", and "A dress needs to be worn to attend a formal banquet" are respectively combined with the minor premises "Tomorrow is a snowy day" "Tomorrow is a workday", and "Tomorrow needs to attend a formal banquet". A most appropriate premise combination is selected from all premise combinations obtained through combination is "A dress needs to be worn to attend a formal banquet" and "Tomorrow needs to attend a formal banquet", and the premise combination is input into the deductor for deductive reasoning, to obtain an answer "Wear a dress tomorrow".

Step ⑧: Input the answer obtained through deductive reasoning into an answer verification module for answer verification, and determine whether the answer conforms to a fact and common sense logic.

Step ⑨: Perform result presentation on an answer that is verified successfully by the answer verification module, where the result presentation includes the answer and a reasoning process of the answer.

For example, for the query of the user "What to wear tomorrow?", while the answer "Wear a dress tomorrow" is presented, a deductive reasoning process of "A dress needs to be worn to attend a formal banquet"+"Tomorrow needs to attend a formal banquet"=>"Wear a dress tomorrow", and an inductive reasoning process of "A formal dress needs to be worn to attend a charity dinner", "A low-profile dress needs to be worn to attend a wedding banquet", "A suit and an address need to be worn to attend a business banquet", and "Casual clothing can be worn to attend a close friend banquet"=>"A dress needs to be worn to attend a formal banquet" are presented. In addition, for the major premise evidence and the minor premise evidence, web page source information (such as a URL and a title) is also provided.

It should be noted that, for descriptions of the embodiment shown in FIG. 8, refer to the descriptions of embodiments shown in FIG. 3 to FIG. 7.

In application scenarios shown in FIG. 3 to FIG. 8, the user equipment 310 and the query system 320 are connected through the network 330, and the user equipment 310 and the query system 320 are different electronic devices. For example, the user equipment 310 may be a user terminal, and the query system 320 may be a server. It should be understood that the application scenarios shown in FIG. 3 to FIG. 8 are merely one of application scenarios of the query system 320, or may be other application scenarios. This is not specifically limited in this disclosure. For example, the query system 320 is used in an electronic device. The electronic device includes a screen or a user interface, and the screen or the user interface is used by the user to perform a query operation.

Figure 9:
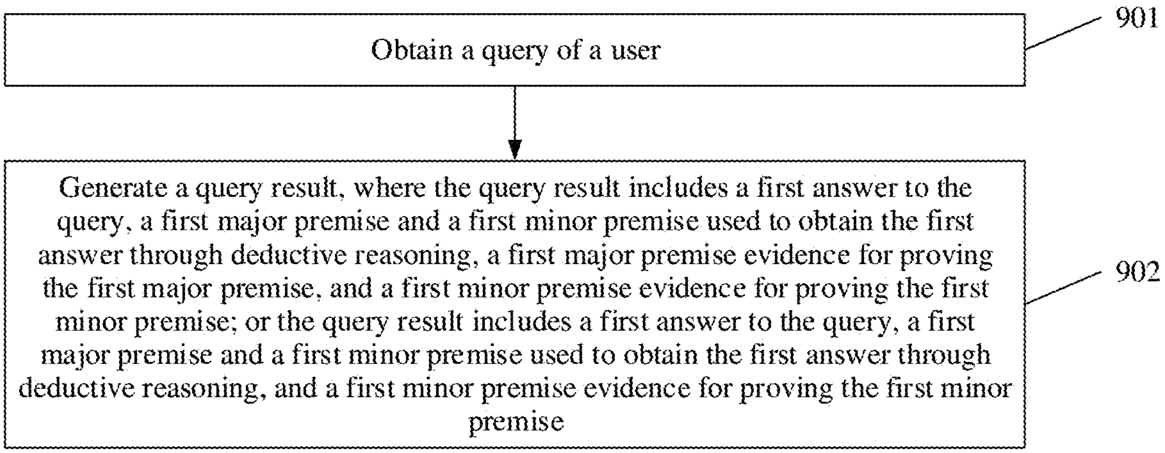
FIG. 9 is a schematic flowchart of still another example query method according to an embodiment of this disclosure.

FIG. 9 is a schematic flowchart of still another example query method according to an embodiment of this disclosure. The query method is applied to a first electronic device. The first electronic device may be a server or a terminal. For example, the first electronic device is an electronic device including the query system 320. The query method includes but is not limited to the following steps.

901: Obtain a query of a user.

902: Generate a query result, where the query result includes a first answer to the query, a first major premise and a first minor premise used to obtain the first answer through deductive reasoning, a first major premise evidence for proving the first major premise, and a first minor premise evidence for proving the first minor premise; or the query result includes a first answer to the query, a first major premise and a first minor premise used to obtain the first answer through deductive reasoning, and a first minor premise evidence for proving the first minor premise.

The first major premise evidence and the first minor premise evidence are evidence information obtained through retrieval of the query of the user. The first major premise is obtained through inductive reasoning based on the first major premise evidence, or the first major premise is common sense information obtained through retrieval of the query of the user. It should be understood that, when the first major premise is the common sense information obtained through retrieval, the query result does not include the major premise evidence; or when the first major premise is obtained through inductive reasoning based on the first major premise evidence, the query result includes the first major premise evidence. The first minor premise is generated based on the first minor premise evidence.

In this embodiment, for the query of the user, the first electronic device may retrieve related major premise evidences and minor premise evidences. For example, the first electronic device may absorb knowledge from massive information on an internet as a major premise evidence and a minor premise evidence. The major premise evidence may be used to obtain a major premise, and the minor premise evidence may be used to obtain a minor premise. This greatly improves query coverage. In addition, for the query of the user, the first electronic device may alternatively directly retrieve a related major premise. For example, the first electronic device may retrieve common sense information as a major premise of deductive reasoning. The first electronic device may perform inductive reasoning based on the major premise evidence obtained through retrieval to obtain a major premise of deductive reasoning, and generate, based on a minor premise evidence obtained through retrieval, a minor premise of deductive reasoning. Then, the electronic device performs deductive reasoning based on the major premise obtained through retrieval and/or inductive reasoning and the foregoing generated minor premise, to obtain an answer to the query. In this way, the first electronic device can obtain an answer to the query through deductive reasoning, and therefore can provide correct answers to a common sense query, an opinion query, a complex query, and a new query. In addition, in addition to the answer to the query, a query result further includes the major premise and the minor premise used to obtain the answer through deductive reasoning, and the major premise evidence for proving the major premise and the minor premise evidence for proving the minor premise. This can improve the credibility and explainability of the query.

In an example embodiment, the generating a query result includes: obtaining N second major premises based on a first vector, where the first vector represents a target text, the target text indicates the query, the N second major premises include the first major premise, and N is a positive integer; performing retrieval in a first database based on N second vectors, to obtain P second minor premise evidences, where the N second vectors correspond to the N second major premises, any one of the N second vectors represents the target text and a second major premise corresponding to the any second vector, the P second minor premise evidences include the first minor premise evidence, and P is a positive integer; generating M second minor premises based on the target text, the N second major premises, and the P second minor premise evidences, where the M second minor premises include the first minor premise, and M is a positive integer less than or equal to P; and performing deductive reasoning based on the N second major premises and the M second minor premises, to obtain the first answer, where the first major premise evidence is obtained through retrieval in the first database based on the first vector.

The first vector may be obtained by performing vector representation on the target text by using a semantic representation model, and the second vector may be obtained by performing vector representation on the target text and the second major premise by using the semantic representation model. It should be understood that the target text and one major premise are represented as one second vector. Because there are *N major* premises, there are N second vectors.

The first database may be a web page library. In an example, the first database is the web page library 326. In addition, the first database may be a database in the first electronic device, or may be a database outside the first electronic device.

In this embodiment, for the query of the user, the first electronic device can automatically select an appropriate major premise, and then automatically select an appropriate minor premise evidence from the first database (for example, the web page library) to generate a minor premise. This supplements a reasoning path of deductive reasoning, and effectively predicts the answer to the query.

In an example embodiment, the obtaining N second major premises based on a first vector includes: performing retrieval in the first database based on the first vector, to obtain L second major premise evidences, where L is a positive integer greater than or equal to N; and performing inductive reasoning based on the L second major premise evidences, to obtain the N second major premises.

For example, the L second major premise evidences may include the first major premise evidence.

In this embodiment, for the query of the user, the first electronic device can automatically select an appropriate major premise evidence from the first database (for example, the web page library) to perform inductive reasoning, to obtain a major premise. This helps supplement the reasoning path of deductive reasoning.

In an example embodiment, the performing inductive reasoning based on the L second major premise evidences, to obtain the N second major premises includes: performing retrieval in the first database based on the first vector, to obtain a negative example of a third major premise evidence, where the L second major premise evidences include the third major premise evidence, and the third major premise evidence is used to obtain a third major premise through inductive reasoning; and performing inductive reasoning based on the negative example of the third major premise evidence, to obtain a fourth major premise, where if the third major premise does not conflict with the fourth major premise, the third major premise is one of the N second major premises; or if the third major premise conflicts with the fourth major premise, retrieval is performed in the first database based on the first vector, to obtain a fourth major premise evidence, and inductive reasoning is performed based on the fourth major premise evidence, to obtain a fifth major premise, where the fifth major premise is one of the N second major premises.

In this embodiment, the first electronic device obtains a major premise of deductive reasoning through inductive reasoning in a negative example induction manner. A process of negative example induction is as follows: One major premise is obtained through inductive reasoning based on a major premise evidence, and another major premise is obtained through inductive reasoning based on a negative example of the major premise evidence. Then, whether the two major premises obtained through induction conflict is determined. If the two major premises do not conflict, the major premise obtained through inductive reasoning based on the major premise evidence is accurate and credible, and can be for deductive reasoning; or if the two major premises conflict, a major premise evidence is re-retrieved for the query of the user, and negative example induction is performed again based on the major premise evidence obtained through re-retrieval. In this way, the first electronic device has high accuracy and credibility during inductive reasoning, adapts to a feature of noisy and different internet information, and imitates a human cognitive development process (that is, a process of continuously correcting information that is newly input and that is not expected). It should be noted that, when the first electronic device obtains the major premise of deductive reasoning through inductive reasoning in a negative example induction manner, the first electronic device may re-retrieve the major premise evidence. Therefore, the L second major premise evidences do not necessarily include the first major premise evidence, and the first major premise evidence may be the major premise evidence obtained through re-retrieval. For example, the first major premise evidence is the fourth major premise evidence.

In an example embodiment, the obtaining N second major premises based on a first vector includes: performing retrieval in the first database based on the first vector, to obtain R second major premise evidences, where R is a positive integer; performing retrieval in a second database based on the first vector, to obtain target common sense information; and performing inductive reasoning based on the R second major premise evidences and the target common sense information, to obtain Q second major premises, where Q is a positive integer less than or equal to R; and the N second major premises include the target common sense information and the Q second major premises.

For example, the R second major premise evidences may include the first major premise evidence.

The second database may be a common sense library. Common sense information stored in the common sense library is a major premise obtained through pre-inductive reasoning. For example, the first electronic device may extract common sense information from an internet (for example, a web page library) in an offline inductive reasoning manner, and store the common sense information in the common sense library. In an example, the second database is the common sense library 327. In addition, the second database may be a database in the first electronic device, or may be a database outside the first electronic device.

In this embodiment, for the query of the user, the first electronic device can automatically select an appropriate major premise evidence from the first database (for example, the web page library) to perform inductive reasoning, to obtain a major premise, and can automatically select appropriate common sense information from the second database (for example, the common sense library) as a major premise. This helps supplement the reasoning path of deductive reasoning. The common sense information is obtained through pre-inductive reasoning, and the common sense information obtained through retrieval may be used as the major premise. This reduces a workload of inductive reasoning during an online query. Inductive reasoning is performed based on the common sense information obtained through retrieval and the major premise evidence obtained through retrieval in the web page library. The common sense information may assist in inductive reasoning on the major premise evidence. This helps obtain a correct major premise. For example, the common sense information obtained through retrieval and the major premise evidence obtained through retrieval are input into an inductor together, to assist the inductor in performing inductive reasoning, so as to obtain a more accurate major premise.

In an example embodiment, the method further includes: writing the Q second major preambles into the second database.

In this embodiment, in a process of performing the online query, the first electronic device may store, in the common sense library, the major premise obtained through inductive reasoning. This continuously refreshes the common sense library and enriches common sense information in the common sense library.

In an example embodiment, the performing deductive reasoning based on the N second major premises and the M second minor premises, to obtain the first answer includes: determining a first premise combination from N×M premise combinations, where the N×M premise combinations are obtained by combining each of the N second major premises with each of the M second minor premises, and the first premise combination includes the first major premise and the first minor premise; and performing deductive reasoning based on the first premise combination, to obtain the first answer.

In this embodiment, for one query, a plurality of major premises may be obtained through induction and a plurality of minor premises may be generated. After combining each major premise with each minor premise, the first electronic device selects a most appropriate premise combination from all premise combinations obtained through combination for deductive reasoning, to obtain an answer to the query. This performs deductive reasoning based on the premise combination, and can form an explicit reasoning path. For example, the premise combinations obtained through combination may be scored and sorted based on a specific scoring policy, to facilitate selection of the most appropriate premise combination for deductive reasoning. This can select a best reasoning path to generate an answer to the query.

In an example embodiment, the performing deductive reasoning based on the first premise combination, to obtain the first answer includes: inputting a term graph into a deductor, to obtain the first answer, where the term graph represents the first premise combination, and the deductor is a neural network model for deductive reasoning.

In this embodiment, a premise combination of a free text is converted into a term graph as an input of the deductor, so that the deductor directly models a logical relationship of the free text. This effectively improves a logical reasoning capability of the deductor for the free text, and helps the deductor output a correct answer to a query.

In an example embodiment, the method further includes: calculating a loss based on term graph coding and syllogism text coding, where the term graph coding is a coding representation of the term graph, and the syllogism text coding is a coding representation of a syllogism text including the first answer, the first major premise, and the first minor premise; and adjusting a model parameter of the deductor based on the loss.

In this embodiment, in a process of performing deductive reasoning, the first electronic device further calculates the loss based on the coding representation of the term graph and the coding representation of the syllogism text, and adjusts the model parameter of the deductor based on the loss. In other words, in a process of performing deductive reasoning by using the deductor, the loss is calculated by using an input and an output of the deductor, and the model parameter of the deductor is adjusted, to implement training optimization of the deductor. This helps improve deductive reasoning precision of the deductor.

In an example embodiment, the determining a first premise combination from N×M premise combinations includes: determining a second premise combination from the N×M premise combinations; performing deductive reasoning based on the second premise combination, to obtain a second answer; and determining the first premise combination from the N×M premise combinations based on feedback from the user and/or feedback from an answer verification module for the second answer, where the answer verification module is configured to determine whether an answer obtained through deductive reasoning conforms to factual logic.

In this embodiment, because there are a large quantity of premise combinations obtained through combination and all the premise combinations can generate a deductive reasoning conclusion, a most appropriate premise combination may be selected, based on feedback from the user and/or feedback from the answer verification module for the deductive reasoning conclusion, in real time for deductive reasoning. This improves a speed of optimizing query effect of the first electronic device, and provides a correct answer to a query.

In an example embodiment, the target text further includes user context information of the user.

In this embodiment, the first electronic device obtains the query of the user and the user context information for retrieval. This can improve query experience of the user.

In an example embodiment, the method further includes: presenting a query interface on a screen of the first electronic device, where the query interface includes the query result.

In this embodiment, the first electronic device may include the screen. The user may input the query on the screen, and then the first electronic device displays the query interface on the screen of the first electronic device. In addition to the answer to the query, the query interface also presents the major premise and the minor premise of deductive reasoning, the major premise evidence, and the minor premise evidence. This presents an entire reasoning process of the query and related evidence, and greatly enhances query credibility and explainability.

In an example embodiment, the obtaining a query of a user includes: receiving the query from a second electronic device; and the method further includes: sending the query result to the second electronic device.

In this embodiment, the second electronic device includes a screen. The user may input the query on the screen of the second electronic device. The second electronic device sends the query to the first electronic device. The first electronic device generates the query result of the query and sends the query result back to the second electronic device. Then, the second electronic device presents a query interface on the screen of the second electronic device, so as to feed back the query result to the user. This enriches application scenarios of the query.

It should be noted that, for descriptions of the embodiment shown in FIG. 9, refer to the descriptions of embodiments shown in FIG. 3 to FIG. 8.

Figure 10:
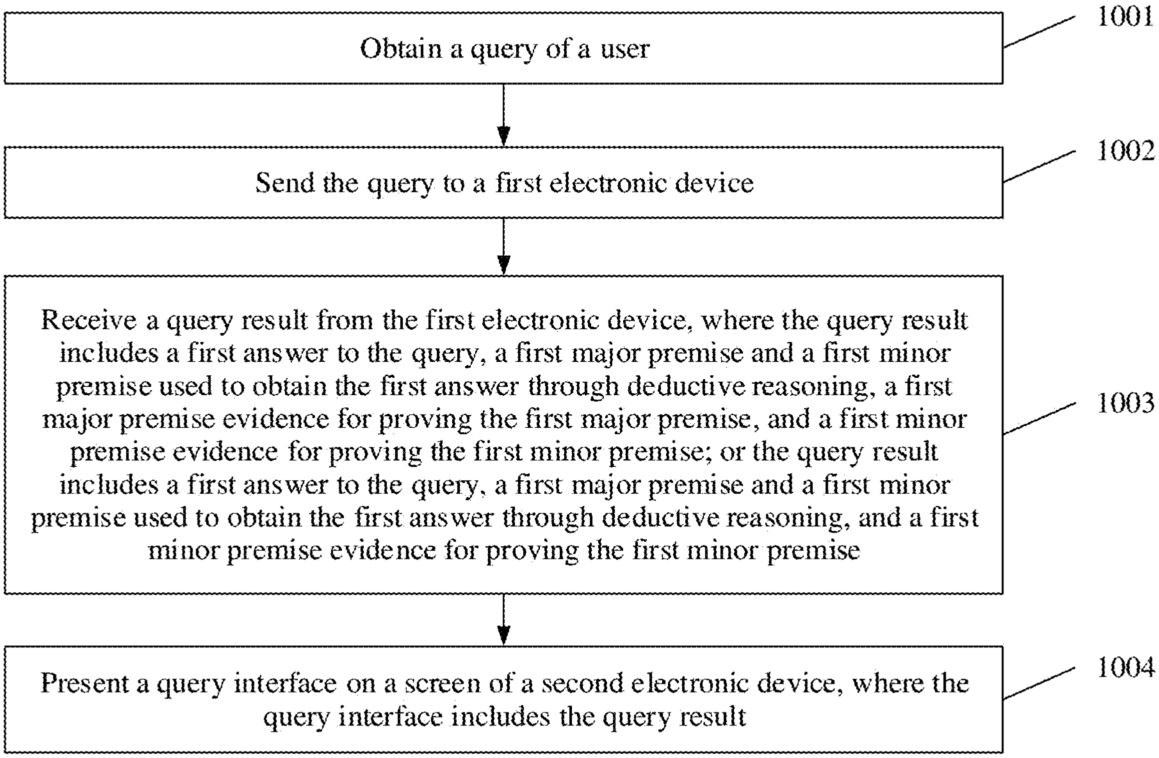
FIG. 10 is a schematic flowchart of yet another example query method according to an embodiment of this disclosure.

FIG. 10 is a schematic flowchart of yet another example query method according to an embodiment of this disclosure. The query method is applied to a second electronic device. For example, the second electronic device is the user equipment 310. The query method includes but is not limited to the following steps.

1001: Obtain a query of a user.

1002: Send the query to a first electronic device.

1003: Receive a query result from the first electronic device, where the query result includes a first answer to the query, a first major premise and a first minor premise used to obtain the first answer through deductive reasoning, a first major premise evidence for proving the first major premise, and a first minor premise evidence for proving the first minor premise; or the query result includes a first answer to the query, a first major premise and a first minor premise used to obtain the first answer through deductive reasoning, and a first minor premise evidence for proving the first minor premise.

1004: Present a query interface on a screen of the second electronic device, where the query interface includes the query result.

In this embodiment, the second electronic device includes the screen. The user may input the query of the user on the screen of the second electronic device. The second electronic device sends the query to the first electronic device. The first electronic device generates the query result of the query and sends the query result back to the second electronic device. Then, the second electronic device presents the query interface on the screen of the second electronic device, so as to feed back the query result to the user. This enriches application scenarios of the query.

It should be noted that, for descriptions of the embodiment shown in FIG. 10, refer to the descriptions of embodiments shown in FIG. 3 to FIG. 9.

Figure 11:
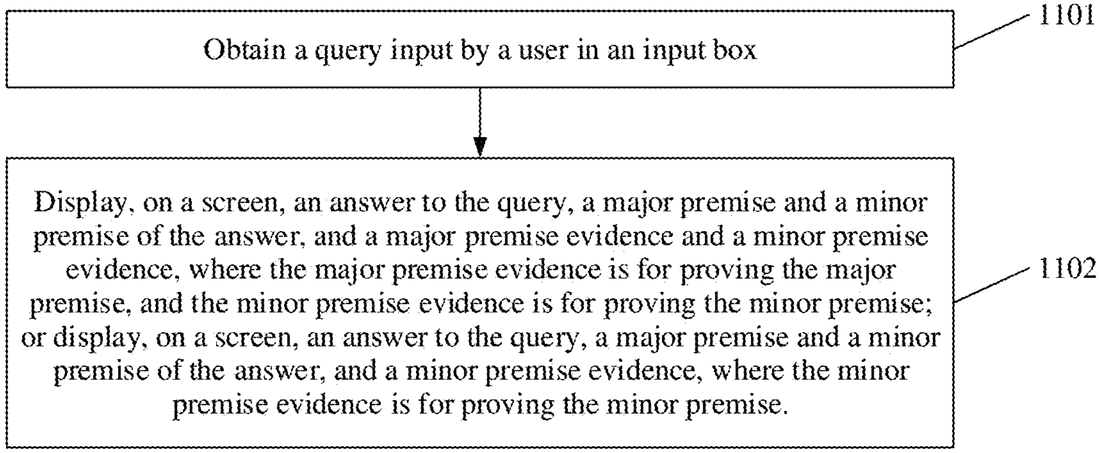
FIG. 11 is a schematic flowchart of yet another example query method according to an embodiment of this disclosure.

FIG. 11 is a schematic flowchart of yet another example query method according to an embodiment of this disclosure. The query method is applied to an electronic device. For example, the electronic device is an electronic device including the query system 320. For example, the electronic device is a first electronic device or a second electronic device. The electronic device includes a screen, and the screen displays an input box. The query method includes but is not limited to the following steps.

1101: Obtain a query input by a user in the input box.

1102: Display, on a screen, an answer to the query, a major premise and a minor premise of the answer, and a major premise evidence and a minor premise evidence, where the major premise evidence is for proving the major premise, and the minor premise evidence is for proving the minor premise; or display, on the screen, an answer to the query, a major premise and a minor premise of the answer, and a minor premise evidence, where the minor premise evidence is for proving the minor premise.

For example, the input box displayed on the screen is the query input box 3111. The answer displayed on the screen is the first answer. The major premise displayed on the screen is the first major premise, and the minor premise displayed on the screen is the first minor premise. The major premise evidence displayed on the screen is the first major premise evidence, and the minor premise evidence displayed on the screen is the first minor premise evidence.

A diagram of an interface on which the answer, the major premise, the minor premise, the major premise evidence, the minor premise evidence, and the like are displayed on the screen may be shown in FIG. 4 to FIG. 6. It should be noted that, when the screen displays the answer, the major premise, the minor premise, the major premise evidence, the minor premise evidence, and the like, the query input by the user may not be displayed, for example, the query input box (for example, the query input box 3111) is not displayed. In other words, when the user operates the electronic device to perform the query, after the user inputs the query in the input box, an interface of the screen jumps. The input box is no longer displayed on an interface obtained after the jump, and only the answer, the major premise, the minor premise, the major premise evidence, the minor premise evidence, and the like are displayed.

In this embodiment, the electronic device may include the screen. The user may input the query on the screen, and then the electronic device displays, on the screen of the electronic device, the answer to the query, the major premise and the minor premise of deductive reasoning, the major premise evidence, and the minor premise evidence. This presents an entire reasoning process of the query and related evidence, and greatly enhances query credibility and explainability.

In an example embodiment, the screen displays a first presentation box, a second presentation box, and a third presentation box, the first presentation box presents the answer, the second presentation box presents the major premise and the minor premise, and the third presentation box presents the major premise evidence and the minor premise evidence, or the third presentation box presents the minor premise evidence.

For example, the first presentation box is the answer presentation box 3113, the second presentation box is the reasoning path presentation box 3114 or the common sense and reasoning path presentation box 3117, and the third presentation box is the premise evidence presentation box 3115. An answer presented in the first presentation box is the first answer. A major premise presented in the second presentation box is the first major premise, and a minor premise presented in the second presentation box is the first minor premise. A major premise evidence presented in the third presentation box is the first major premise evidence, and a minor premise evidence presented in the third presentation box is the first minor premise evidence.

In an example embodiment, the screen displays a fourth presentation box, and the fourth presentation box presents the answer, the major premise, the minor premise, the major premise evidence, and the minor premise evidence, or the fourth presentation box presents the answer, the major premise, the minor premise, and the minor premise evidence.

For example, the fourth presentation box is the query card 3112.

In an example embodiment, the screen displays a fifth presentation box and a sixth presentation box, the sixth presentation box is a pop-up presentation box of the fifth presentation box, the fifth presentation box presents the answer, and the fifth presentation box presents the major premise, the minor premise, the major premise evidence, and the minor premise evidence, or the fifth presentation box presents the major premise, the minor premise, and the minor premise evidence.

For example, the fifth presentation box is the query card 3112 or the answer presentation box 3113, and the sixth presentation box is the pop-up query card 3118.

In an example embodiment, the method further includes: displaying a direct evidence on the screen, where the direct evidence is for proving the answer.

In an example embodiment, the screen further displays a seventh presentation box, and the seventh presentation box presents the direct evidence.

For example, the seventh presentation box is the direct evidence presentation box 3116.

In an example embodiment, the fourth presentation box further presents the direct evidence.

In an example embodiment, the sixth presentation box further presents the direct evidence.

It should be noted that, for descriptions of the embodiment shown in FIG. 11, refer to the descriptions of embodiments shown in FIG. 3 to FIG. 10.

Figure 12:
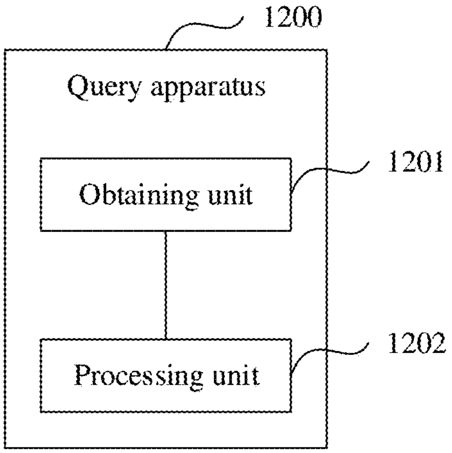
FIG. 12 is a diagram of a structure of an example query apparatus according to an embodiment of this disclosure.

FIG. 12 is a diagram of a structure of an example query apparatus according to an embodiment of this disclosure. The query apparatus 1200 is used in a first electronic device, and the query apparatus 1200 includes:

an obtaining unit 1201, configured to obtain a query of a user; and a processing unit 1202, configured to generate a query result, where the query result includes a first answer to the query, a first major premise and a first minor premise used to obtain the first answer through deductive reasoning, a first major premise evidence for proving the first major premise, and a first minor premise evidence for proving the first minor premise; or the query result includes a first answer to the query, a first major premise and a first minor premise used to obtain the first answer through deductive reasoning, and a first minor premise evidence for proving the first minor premise.

In an example embodiment, the processing unit 1202 is specifically configured to: obtain N second major premises based on a first vector, where the first vector represents a target text, the target text indicates the query, the N second major premises include the first major premise, and N is a positive integer; perform retrieval in a first database based on N second vectors, to obtain P second minor premise evidences, where the N second vectors correspond to the N second major premises, any one of the N second vectors represents the target text and a second major premise corresponding to the any second vector, the P second minor premise evidences include the first minor premise evidence, and P is a positive integer; generate M second minor premises based on the target text, the N second major premises, and the P second minor premise evidences, where the M second minor premises include the first minor premise, and M is a positive integer less than or equal to P; and perform deductive reasoning based on the N second major premises and the M second minor premises, to obtain the first answer, where the first major premise evidence is obtained through retrieval in the first database based on the first vector.

In an example embodiment, the processing unit 1202 is specifically configured to: perform retrieval in the first database based on the first vector, to obtain L second major premise evidences, where Lis a positive integer greater than or equal to N; and perform inductive reasoning based on the L second major premise evidences, to obtain the N second major premises.

In an example embodiment, the processing unit 1202 is specifically configured to: perform retrieval in the first database based on the first vector, to obtain a negative example of a third major premise evidence, where the L second major premise evidences include the third major premise evidence, and the third major premise evidence is used to obtain a third major premise through inductive reasoning; and perform inductive reasoning based on the negative example of the third major premise evidence, to obtain a fourth major premise, where if the third major premise does not conflict with the fourth major premise, the third major premise is one of the N second major premises; or if the third major premise conflicts with the fourth major premise, retrieval is performed in the first database based on the first vector, to obtain a fourth major premise evidence, and inductive reasoning is performed based on the fourth major premise evidence, to obtain a fifth major premise, where the fifth major premise is one of the N second major premises.

In an example embodiment, the processing unit 1202 is specifically configured to: perform retrieval in the first database based on the first vector, to obtain R second major premise evidences, where R is a positive integer; perform retrieval in a second database based on the first vector, to obtain target common sense information; and perform inductive reasoning based on the R second major premise evidences and the target common sense information, to obtain Q second major premises, where Q is a positive integer less than or equal to R; and the N second major premises include the target common sense information and the Q second major premises.

In an example embodiment, the processing unit 1202 is specifically configured to: determine a first premise combination from N×M premise combinations, where the N×M premise combinations are obtained by combining each of the N second major premises with each of the M second minor premises, and the first premise combination includes the first major premise and the first minor premise; and perform deductive reasoning based on the first premise combination, to obtain the first answer.

In an example embodiment, the processing unit 1202 is specifically configured to: input a term graph into a deductor, to obtain the first answer, where the term graph represents the first premise combination, and the deductor is a neural network model for deductive reasoning.

In an example embodiment, the processing unit 1202 is further configured to: calculate a loss based on term graph coding and syllogism text coding, where the term graph coding is a coding representation of the term graph, and the syllogism text coding is a coding representation of a syllogism text including the first answer, the first major premise, and the first minor premise; and adjust a model parameter of the deductor based on the loss.

In an example embodiment, the processing unit 1202 is specifically configured to: determine a second premise combination from the N×M premise combinations; perform deductive reasoning based on the second premise combination, to obtain a second answer; and determine the first premise combination from the N×M premise combinations based on feedback from the user and/or feedback from an answer verification module for the second answer, where the answer verification module is configured to determine whether an answer obtained through deductive reasoning conforms to factual logic.

In an example embodiment, the processing unit 1202 is further configured to: present a query interface on a screen of the first electronic device, where the query interface includes the query result.

In an example embodiment, the obtaining unit 1201 is specifically configured to receive the query from a second electronic device; and the processing unit 1202 is further configured to send the query result to the second electronic device.

It should be noted that, for an implementation of each operation of the query apparatus 1200 described in FIG. 12, refer to corresponding descriptions in the embodiment shown in FIG. 9. In addition, for beneficial effect brought by the query apparatus 1200 described in FIG. 12, refer to corresponding descriptions in the embodiment shown in FIG. 9.

Figure 13:
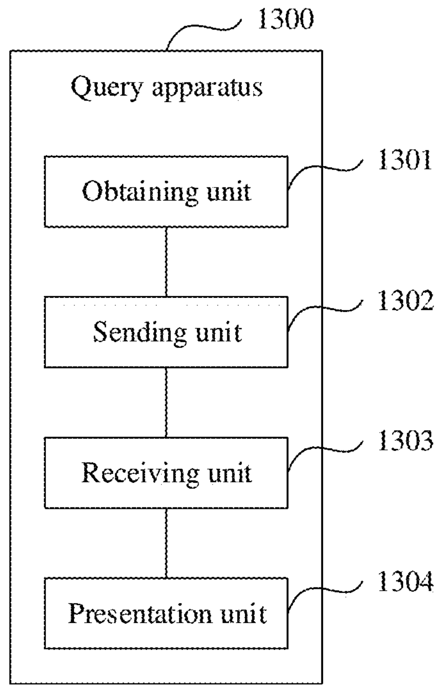
FIG. 13 is a diagram of a structure of another example query apparatus according to an embodiment of this disclosure.

FIG. 13 is a diagram of a structure of another example query apparatus according to an embodiment of this disclosure. The query apparatus 1300 is used in a second electronic device, and the query apparatus 1300 includes:

- an obtaining unit 1301, configured to obtain a query of a user;
- a sending unit 1302, configured to send the query to a first electronic device;
- a receiving unit 1303, configured to receive a query result from the first electronic device, where the query result includes a first answer to the query, a first major premise and a first minor premise used to obtain the first answer through deductive reasoning, a first major premise evidence for proving the first major premise, and a first minor premise evidence for proving the first minor premise; or the query result includes a first answer to the query, a first major premise and a first minor premise used to obtain the first answer through deductive reasoning, and a first minor premise evidence for proving the first minor premise; and
- a presentation unit 1304, configured to present a query interface on a screen of the second electronic device, where the query interface includes the query result.

It should be noted that, for an implementation of each operation of the query apparatus 1300 described in FIG. 13, refer to corresponding descriptions in the embodiment shown in FIG. 10. In addition, for beneficial effect brought by the query apparatus 1300 described in FIG. 13, refer to corresponding descriptions in the embodiment shown in FIG. 10.

Figure 14:
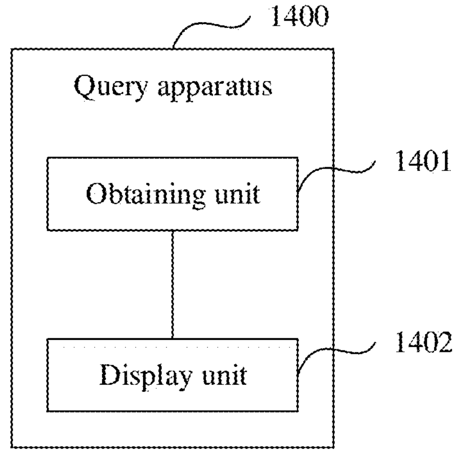
FIG. 14 is a diagram of a structure of still another example query apparatus according to an embodiment of this disclosure.

FIG. 14 is a diagram of a structure of still another example query apparatus according to an embodiment of this disclosure. The query apparatus 1400 is used in an electronic device, the electronic device includes a screen, the screen displays an input box, and the query apparatus 1400 includes:

- an obtaining unit 1401, configured to obtain a query input by a user in the input box; and
- a display unit 1402, configured to display, on the screen, an answer to the query, a major premise and a minor premise of the answer, and a major premise evidence and a minor premise evidence, where the major premise evidence is for proving the major premise, and the minor premise evidence is for proving the minor premise; or a display unit 1402, configured to display, on the screen, an answer to the query, a major premise and a minor premise of the answer, and a minor premise evidence, where the minor premise evidence is for proving the minor premise.

In an example embodiment, the screen displays a first presentation box, a second presentation box, and a third presentation box, the first presentation box presents the answer, the second presentation box presents the major premise and the minor premise, and the third presentation box presents the major premise evidence and the minor premise evidence, or the third presentation box presents the minor premise evidence.

In an example embodiment, the screen displays a fourth presentation box, and the fourth presentation box presents the answer, the major premise, the minor premise, the major premise evidence, and the minor premise evidence, or the fourth presentation box presents the answer, the major premise, the minor premise, and the minor premise evidence.

In an example embodiment, the screen displays a fifth presentation box and a sixth presentation box, the sixth presentation box is a pop-up presentation box of the fifth presentation box, the fifth presentation box presents the answer, and the fifth presentation box presents the major premise, the minor premise, the major premise evidence, and the minor premise evidence, or the fifth presentation box presents the major premise, the minor premise, and the minor premise evidence.

In an example embodiment, the display unit 1402 is further configured to: display a direct evidence on the screen, where the direct evidence is for proving the answer.

In an example embodiment, the screen further displays a seventh presentation box, and the seventh presentation box presents the direct evidence.

In an example embodiment, the fourth presentation box further presents the direct evidence.

In an example embodiment, the sixth presentation box further presents the direct evidence.

It should be noted that, for an implementation of each operation of the query apparatus 1400 described in FIG. 14, refer to corresponding descriptions in the embodiment shown in FIG. 11. In addition, for beneficial effect brought by the query apparatus 1400 described in FIG. 14, refer to corresponding descriptions in the embodiment shown in FIG. 11.

Figure 15:
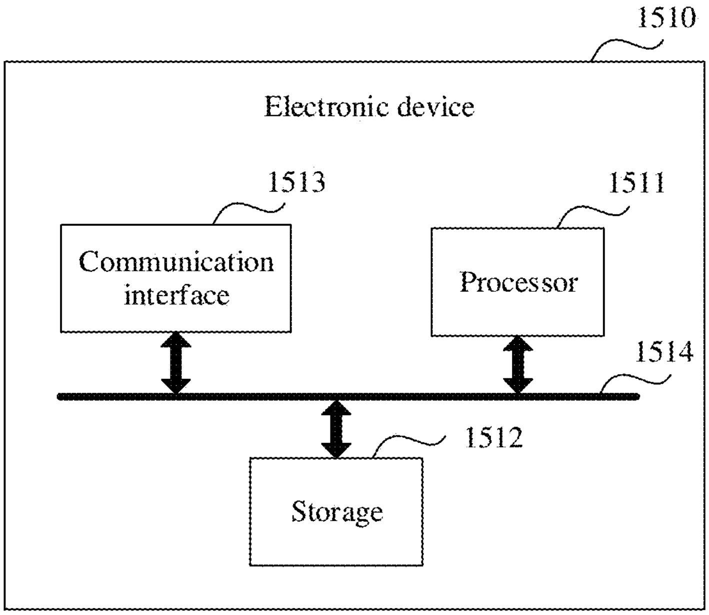
FIG. 15 is a diagram of a structure of an example electronic device according to an embodiment of this disclosure.

FIG. 15 is a diagram of a structure of an example electronic device according to an embodiment of this disclosure. The electronic device 1510 may be a first electronic device or a second electronic device. The electronic device 1510 includes a processor 1511, a storage 1512, and a communication interface 1513. The processor 1511, the storage 1512, and the communication interface 1513 are connected to each other through a bus 1514.

The storage 1512 includes but is not limited to a random access memory (RAM), a read-only memory (ROM), an erasable programmable read-only memory (EPROM), or a compact disc read-only memory (CD-ROM). The storage 1512 is configured to store a related computer program and data. The communication interface 1513 is configured to receive and send data.

The processor 1511 may be one or more central processing units (CPUs). When the processor 1511 is one CPU, the CPU may be a single-core CPU, or may be a multi-core CPU.

The processor 1511 in the electronic device 1510 is configured to read and execute the computer program stored in the storage 1512, to perform the method in the embodiment shown in FIG. 9, FIG. 10, or FIG. 11.

It should be noted that, for an implementation of each operation of the electronic device 1510 described in FIG. 15, refer to corresponding descriptions in the embodiment shown in FIG. 9, FIG. 10, or FIG. 11. In addition, for beneficial effect brought by the electronic device 1510 described in FIG. 15, refer to corresponding descriptions in the embodiment shown in FIG. 9, FIG. 10, or FIG. 11.

An embodiment of this disclosure provides an electronic device, including: a processor; and a storage coupled to the processor and storing a computer program executed by the processor. When the computer program is executed by the processor, the electronic device is enabled to perform the method in the embodiment shown in FIG. 9, FIG. 10, or FIG. 11.

An embodiment of this disclosure provides a chip, including a processor, configured to invoke a computer program from a storage and run the computer program, so that a device on which the chip is installed performs the method in the embodiment shown in FIG. 9, FIG. 10, or FIG. 11.

An embodiment of this disclosure provides a computer-readable storage medium. The computer-readable storage medium stores instructions. When the instructions are executed by a processor, the method in the embodiment shown in FIG. 9, FIG. 10, or FIG. 11 is implemented.

An embodiment of this disclosure provides a computer program product including a computer program. When the computer program is executed by a processor, the method in the embodiment shown in FIG. 9, FIG. 10, or FIG. 11 is implemented.

It should be understood that, the processor mentioned in embodiments of this disclosure may be a Central Processing Unit (CPU), or may be another general-purpose processor, a Digital Signal Processor (DSP), an Application-Specific Integrated Circuit (ASIC), a Field Programmable Gate Array (FPGA), or another programmable logic device, discrete gate or transistor logic device, discrete hardware component, or the like. The general-purpose processor may be a microprocessor, or the processor may be any conventional processor, or the like.

It may be understood that the storage mentioned in embodiments of this disclosure may be a volatile memory or a non-volatile memory, or may include a volatile memory and a non-volatile memory. The non-volatile memory may be a Read-Only Memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a Random Access Memory (RAM), used as an external cache. By way of example, and not limitation, RAMs in many forms may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate, a transistor logic device, or a discrete hardware component, the storage (a storage module) is integrated into the processor.

It should be noted that the storage described in this specification aims to include but is not limited to these storages and any storage of another appropriate type.

It should be further understood that "first", "second", "third", "fourth", and various numbers in this specification are merely used for differentiation for ease of description, and are not intended to limit the scope of this disclosure.

It should be understood that the term "and/or" in this specification describes only an association relationship between associated objects and represents that any one of three relationships may exist. For example, A and/or B may represent one of the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of embodiments of this disclosure.

Persons of ordinary skill in the art may be aware that, in combination with the examples described in embodiments disclosed in this specification, units and algorithm steps may be implemented by electronic hardware or a combination of computer software and electronic hardware. Whether the functions are performed by using hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, refer to a corresponding process in the foregoing method embodiments.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

In addition, functional units in embodiments of this disclosure may be integrated into one processing unit, each of the units may exist alone physically, or two or more units are integrated into one unit.

When the functions are implemented in a form of software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store a computer program, such as a USB flash drive, a removable hard disk, a Read-Only Memory (ROM), a Random Access Memory (RAM), a magnetic disk, or an optical disc.

A sequence of steps of the method in embodiments of this disclosure may be adjusted, combined, or removed based on an actual requirement.

The modules in the apparatus in embodiments of this disclosure may be combined, divided, and deleted based on an actual requirement.

The foregoing embodiments are merely used to describe the technical solutions of this disclosure, but not to limit the technical solutions. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

The invention claimed is:

1. A query method, executed by at least one processor of a first electronic device, wherein the method comprises:

obtaining a query input by a user;

generating a query result based on the query, wherein the query result comprises a first answer to the query, a first major premise and a first minor premise for deriving the first answer through deductive reasoning, and a first minor premise evidence for proving the first minor premise, wherein the first major premise is common sense information obtained through retrieval of the query of the user, and the first minor premise is generated based on the first minor premise evidence; and causing a display of the query result on a screen of the first electronic device wherein the screen displays a first presentation box, a second presentation box, and a third presentation box, the first presentation box presents the first answer, the second presentation box presents the first major premise and the first minor premise, and the third presentation box presents a first major premise evidence for proving the first major premise and the first minor premise evidence, or the third presentation box presents the first minor premise evidence.

2. The method according to claim 1, wherein the generating a query result based on the query comprises:

obtaining N second major premises based on a first vector, wherein the first vector represents a target text, the target text indicates the query, the N second major premises comprise the first major premise, and N is a positive integer;

performing retrieval in a first database based on N second vectors, to obtain P second minor premise evidences, wherein the N second vectors correspond to the N second major premises, each of the N second vectors represents the target text and a second major premise corresponding to the second vector, the P second minor premise evidences comprise the first minor premise evidence, and P is a positive integer;

generating M second minor premises based on the target text, the N second major premises, and the P second minor premise evidences, wherein the M second minor premises comprise the first minor premise, and M is a positive integer less than or equal to P; and performing deductive reasoning based on the N second major premises and the M second minor premises, to obtain the first answer, wherein the first major premise evidence is obtained through performing retrieval in the first database based on the first vector.

3. The method according to claim 2, wherein the obtaining N second major premises based on a first vector comprises:

performing retrieval in the first database based on the first vector, to obtain L second major premise evidences, wherein L is a positive integer greater than or equal to N; and performing inductive reasoning based on the L second major premise evidences, to obtain the N second major premises.

4. The method according to claim 3, wherein the performing inductive reasoning based on the L second major premise evidences, to obtain the N second major premises comprises:

performing retrieval in the first database based on the first vector, to obtain a negative example of a third major premise evidence, wherein the L second major premise evidences comprise the third major premise evidence, and the third major premise evidence is used to obtain a third major premise through inductive reasoning; and performing inductive reasoning based on the negative example of the third major premise evidence, to obtain a fourth major premise, wherein when the third major premise does not conflict with the fourth major premise, the third major premise is one of the N second major premises; or when the third major premise conflicts with the fourth major premise, retrieval is performed in the first database based on the first vector, to obtain a fourth major premise evidence, and inductive reasoning is performed based on the fourth major premise evidence, to obtain a fifth major premise, wherein the fifth major premise is one of the N second major premises.

5. The method according to claim 2, wherein the obtaining N second major premises based on a first vector comprises:

performing retrieval in the first database based on the first vector, to obtain R second major premise evidences, wherein R is a positive integer;

performing retrieval in a second database based on the first vector, to obtain target common sense information; and performing inductive reasoning based on the R second major premise evidences and the target common sense information, to obtain Q second major premises, wherein Q is a positive integer less than or equal to R, wherein the N second major premises comprise the target common sense information and the Q second major premises.

6. The method according to claim 2, wherein the performing deductive reasoning based on the N second major premises and the M second minor premises, to obtain the first answer comprises:

determining a first premise combination from N×M premise combinations, wherein the N×M premise combinations are obtained by combining each of the N second major premises with each of the M second minor premises, and the first premise combination comprises the first major premise and the first minor premise; and performing deductive reasoning based on the first premise combination, to obtain the first answer.

7. The method according to claim 6, wherein the performing deductive reasoning based on the first premise combination, to obtain the first answer comprises:

inputting a term graph into a deductor, to obtain the first answer, wherein the term graph represents the first premise combination, and the deductor is a neural network model for deductive reasoning.

8. The method according to claim 7, further comprising:

calculating a loss based on term graph coding and syllogism text coding, wherein the term graph coding is a coding representation of the term graph, and the syllogism text coding is a coding representation of a syllogism text comprising the first answer, the first major premise, and the first minor premise; and adjusting a model parameter of the deductor based on the loss.

9. The method according to claim 6, wherein the determining a first premise combination from N×M premise combinations comprises:

determining a second premise combination from the N×M premise combinations;

performing deductive reasoning based on the second premise combination, to obtain a second answer; and determining the first premise combination from the N×M premise combinations based on feedback from the user and/or feedback from an answer verification module for the second answer, wherein the answer verification module is configured to determine whether an answer obtained through deductive reasoning conforms to factual logic.

10. The method according to claim 1, further comprising:

causing a display of a query interface on a screen of the first electronic device, wherein the query interface includes one or more elements presenting the query result.

11. The method according to claim 1, wherein the obtaining a query input by a user comprises: receiving the query from a second electronic device; and the method further comprises: sending the query result to the second electronic device.

12. A query method, executed by at least one processor of a second electronic device, wherein the method comprises:

obtaining a query input by a user;

sending the query to a first electronic device;

receiving a query result generated based on the query from the first electronic device, wherein the query result comprises a first answer to the query, a first major premise and a first minor premise for deriving the first answer through deductive reasoning, and a first minor premise evidence for proving the first minor premise; and causing a display of a query interface on a screen of the second electronic device, wherein the query interface includes one or more elements presenting the query result, wherein the first major premise is common sense information obtained through retrieval of the query of the user, and the first minor premise is generated based on the first minor premise evidence, wherein the screen of the second electronic device displays a first presentation box, a second presentation box, and a third presentation box, the first presentation box presents the first answer, the second presentation box presents the first major premise and the first minor premise, and the third presentation box presents a first major premise evidence for proving the first major premise and the first minor premise evidence, or the third presentation box presents the first minor premise evidence.

13. A query method, executed by at least one processor of an electronic device, wherein the electronic device comprises a screen configured to display an input box, and the method comprises:

obtaining a query input by a user in the input box; and displaying, on the screen, an answer to the query, a major premise and a minor premise of the answer, and a major premise evidence and a minor premise evidence, wherein the major premise evidence is for proving the major premise, and the minor premise evidence is for proving the minor premise; and displaying, on the screen, an answer to the query, a major premise and a minor premise of the answer, and a minor premise evidence, wherein the minor premise evidence is for proving the minor premise, wherein the major premise is common sense information obtained through retrieval of the query of the user, and the minor premise is generated based on the minor premise evidence, wherein the screen displays a first presentation box, a second presentation box, and a third presentation box, the first presentation box presents the answer, the second presentation box presents the major premise and the minor premise, and the third presentation box presents the major premise evidence and the minor premise evidence, or the third presentation box presents the minor premise evidence.

14. The method according to claim 13, wherein the screen displays a fourth presentation box, and the fourth presentation box presents the answer, the major premise, the minor premise, the major premise evidence, and the minor premise evidence, or the fourth presentation box presents the answer, the major premise, the minor premise, and the minor premise evidence.

15. The method according to claim 14, wherein the screen displays a fifth presentation box and a sixth presentation box, the sixth presentation box is a pop-up presentation box of the fifth presentation box, the fifth presentation box presents the answer, and the fifth presentation box presents the major premise, the minor premise, the major premise evidence, and the minor premise evidence, or the fifth presentation box presents the major premise, the minor premise, and the minor premise evidence.

16. The method according to claim 15, further comprising: displaying a direct evidence on the screen, wherein the direct evidence is for proving the answer.

17. The method according to claim 16, wherein the screen further displays a seventh presentation box presenting the direct evidence.

18. The method according to claim 16, wherein the fourth presentation box further presents the direct evidence.

19. The method according to claim 16, wherein the sixth presentation box further presents the direct evidence.

* * * * *